United States Patent
Ohashi et al.

(10) Patent No.: US 12,208,692 B2
(45) Date of Patent: Jan. 28, 2025

(54) MOTOR VEHICLE

(71) Applicant: Kabushiki Kaisha F.C.C., Hamamatsu (JP)

(72) Inventors: Tatsuyuki Ohashi, Hamamatsu (JP); Mahmoud Abdelnaby Sayed Abdallah, Hamamatsu (JP); Takaharu Takeshita, Nagoya (JP)

(73) Assignee: Kabushiki Kaisha F.C.C., Hamamatsu (JP)

( * ) Notice: Subject to any disclaimer, the term of this patent is extended or adjusted under 35 U.S.C. 154(b) by 571 days.

(21) Appl. No.: 17/455,040

(22) Filed: Nov. 16, 2021

(65) Prior Publication Data

US 2022/0161663 A1    May 26, 2022
US 2024/0246422 A9    Jul. 25, 2024

(30) Foreign Application Priority Data

Nov. 24, 2020    (JP) .................. 2020-194409

(51) Int. Cl.
*B60L 15/20*    (2006.01)
*B60L 7/12*    (2006.01)
(Continued)

(52) U.S. Cl.
CPC ............ *B60L 15/20* (2013.01); *B60L 7/12* (2013.01); *B60L 7/14* (2013.01); *B60L 7/26* (2013.01);
(Continued)

(58) Field of Classification Search
CPC .......... B60L 15/20; B60L 50/66; B60L 50/40; B60L 58/12; B60L 7/12; B60L 7/14;
(Continued)

(56) References Cited

U.S. PATENT DOCUMENTS 11,442,447 B2 *   9/2022   Endo .................. B60W 50/06
2018/0334046 A1 *   11/2018   Lee .................... H02M 1/44
(Continued)

FOREIGN PATENT DOCUMENTS

JP    2002-084780 A    3/2002
JP    2007-236109 A    9/2007
(Continued)

OTHER PUBLICATIONS

Japanese Office Action dated Jan. 22, 2024 in corresponding Japanese Application No. 2020-194409.

*Primary Examiner* — Peter D Nolan
*Assistant Examiner* — Wae L Louie
(74) *Attorney, Agent, or Firm* — Harness, Dickey & Pierce, P.L.C.

(57) ABSTRACT

A motor performing power driving and regeneration has an inverter, a mechanical brake, a power storage device supplying energy to the motor, an accelerator operator controlling the motor to adjust a drive torque of a driving wheel, a mechanical brake operator controlling the mechanical brake to adjust a braking torque, a regenerative brake operator adjusting a braking torque of the driving wheel and recovering the energy into the power storage device, and a detector detecting a rotation speed of the motor. When the rotation speed of the motor is equal to or higher than a predetermined value, a predetermined braking torque, based on an operation amount of the regenerative brake operator, is generated by regenerative braking.

7 Claims, 20 Drawing Sheets

(51) Int. Cl.
*B60L 7/14* (2006.01)
*B60L 7/26* (2006.01)
*B60L 50/40* (2019.01)
*B60L 50/60* (2019.01)
*B60L 58/12* (2019.01)
*H02J 7/14* (2006.01)
*H02M 7/5395* (2006.01)
*H02P 27/08* (2006.01)

(52) U.S. Cl.
CPC ........... *B60L 15/2009* (2013.01); *B60L 50/40* (2019.02); *B60L 50/66* (2019.02); *B60L 58/12* (2019.02); *H02J 7/1423* (2013.01); *H02M 7/5395* (2013.01); *H02P 27/08* (2013.01); *B60L 2200/12* (2013.01); *B60L 2240/421* (2013.01); *B60L 2240/423* (2013.01); *B60L 2240/547* (2013.01)

(58) Field of Classification Search
CPC .... B60L 7/26; B60L 15/2009; B60L 2200/12; B60L 2240/421; B60L 2240/423; B60L 2240/547; H02J 7/1423; H02M 7/5395; H02P 27/08
See application file for complete search history.

(56) References Cited

U.S. PATENT DOCUMENTS

| | | | |
|---|---|---|---|
| 2019/0288628 A1* | 9/2019 | Kobayashi | B60L 50/75 |
| 2021/0221343 A1* | 7/2021 | Yao | B60T 8/174 |
| 2021/0354681 A1* | 11/2021 | Roy | F16H 63/50 |
| 2021/0380094 A1* | 12/2021 | Choi | B60W 10/08 |
| 2022/0097533 A1* | 3/2022 | Treharne | B60W 20/15 |
| 2022/0118967 A1* | 4/2022 | Sasade | B60K 6/445 |
| 2022/0144114 A1* | 5/2022 | Bin | B60L 53/22 |
| 2022/0161664 A1* | 5/2022 | Takeshita | H02P 27/08 |
| 2022/0161684 A1* | 5/2022 | Sayed Abdallah | B60L 15/007 |
| 2022/0161685 A1* | 5/2022 | Ohashi | B60L 58/20 |
| 2022/0194354 A1* | 6/2022 | Li | F02N 11/0818 |
| 2022/0302731 A1* | 9/2022 | Sakamoto | B60L 58/18 |
| 2023/0264693 A1* | 8/2023 | Lugo-Castillo | B60L 7/18 701/22 |
| 2023/0311883 A1* | 10/2023 | Yamada | B60W 10/08 701/70 |
| 2023/0347747 A1* | 11/2023 | Oh | B60L 15/2009 |
| 2023/0398876 A1* | 12/2023 | Kim | B60L 7/18 |

FOREIGN PATENT DOCUMENTS

| | | |
|---|---|---|
| JP | 2014533920 A | 12/2014 |
| JP | 2016203677 A | 12/2016 |
| WO | WO-2014064729 A1 | 5/2014 |

\* cited by examiner

[ Fig. 1 ]
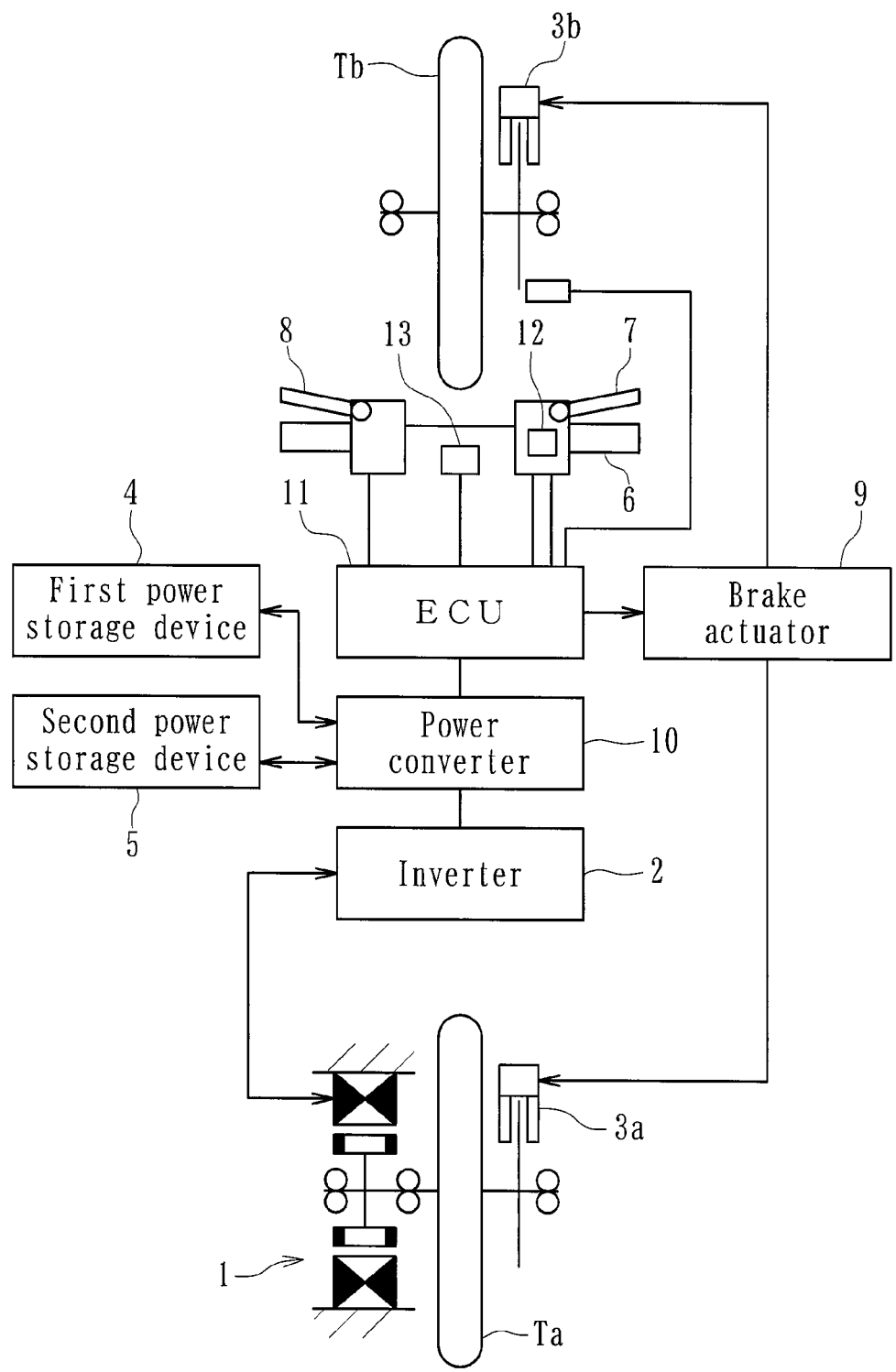

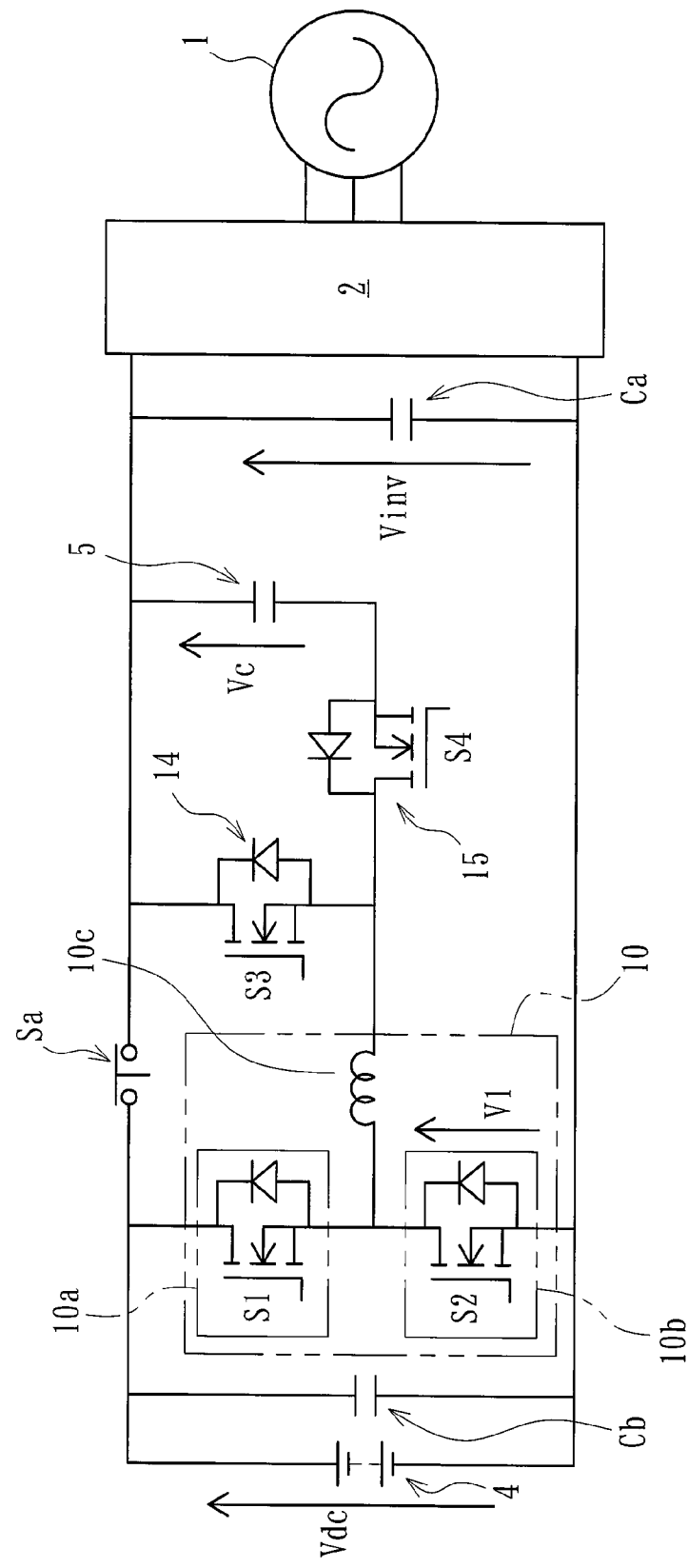
[Fig. 2]

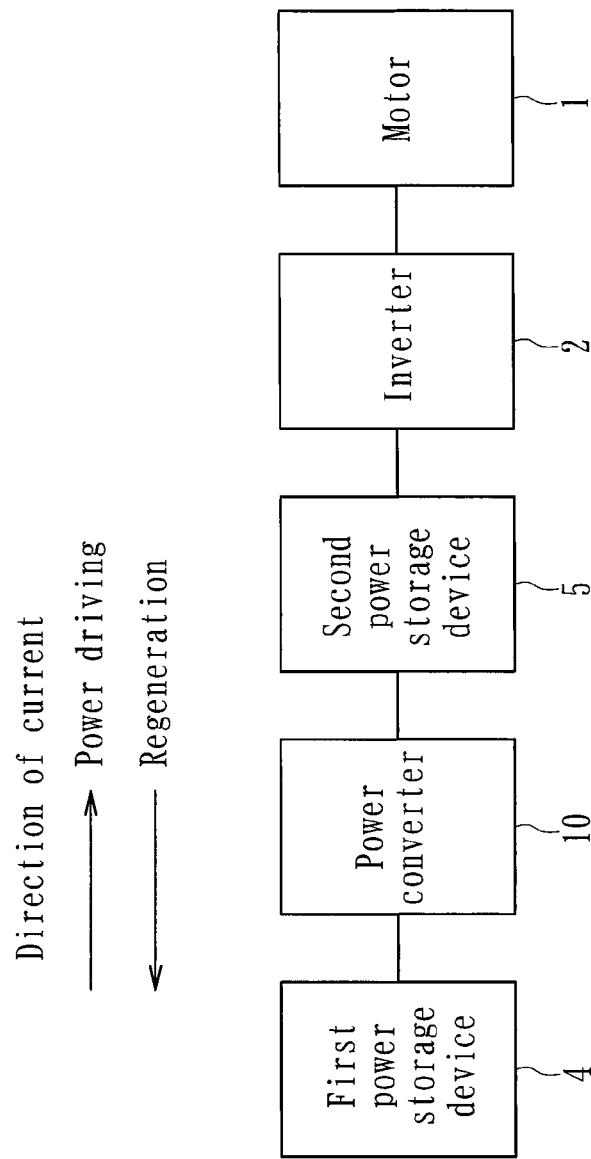
[Fig. 3]

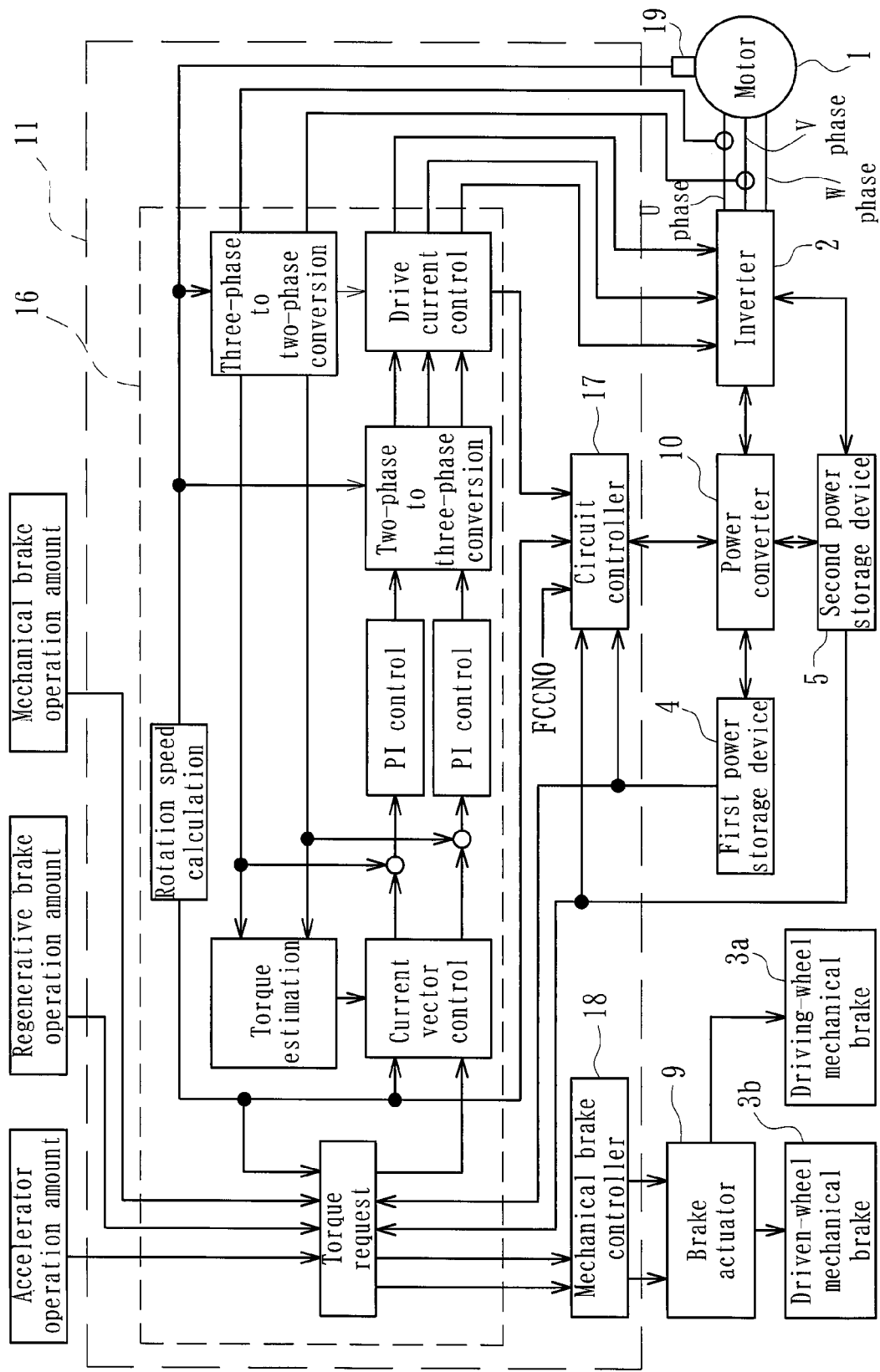
[Fig. 4]

[Fig. 5]
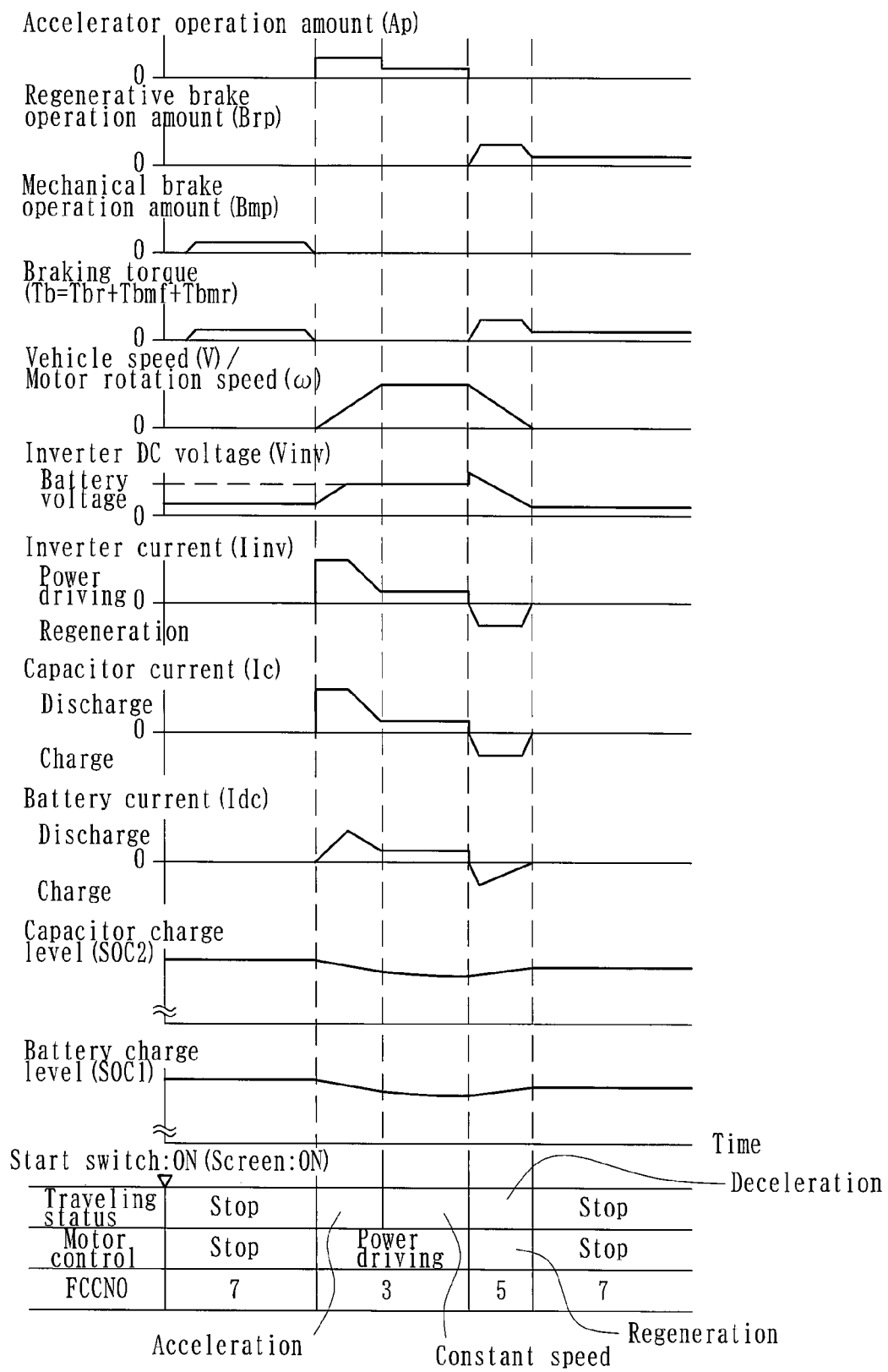

[Fig. 6]
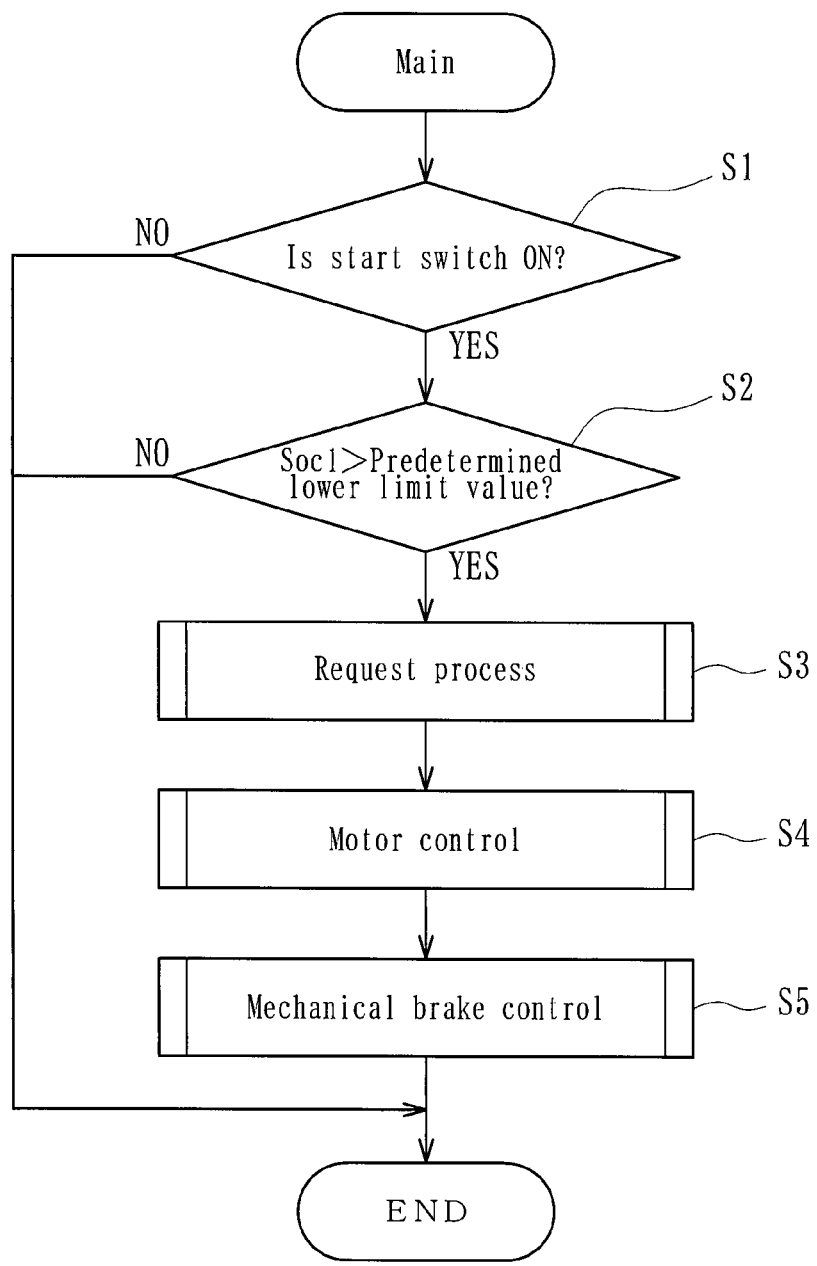

[Fig. 7]
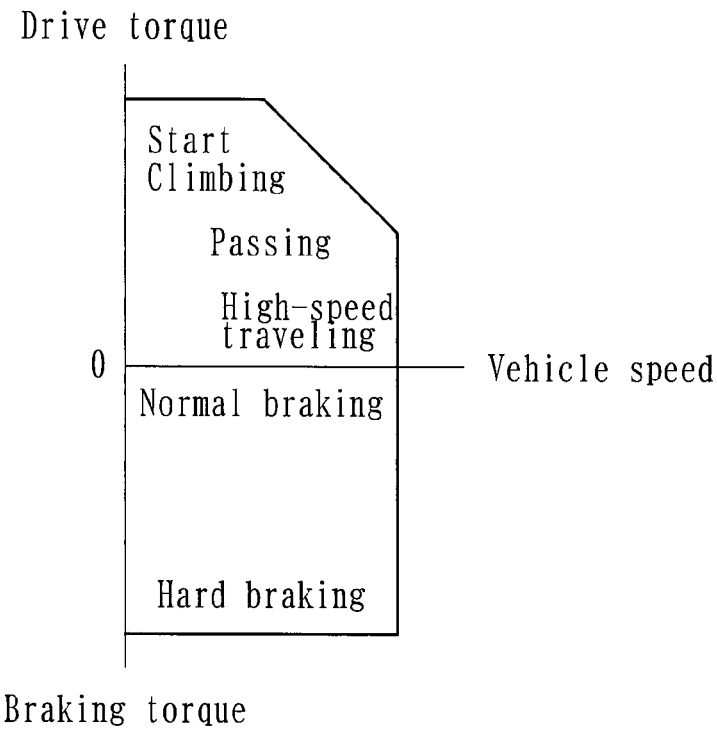
[Fig. 8]
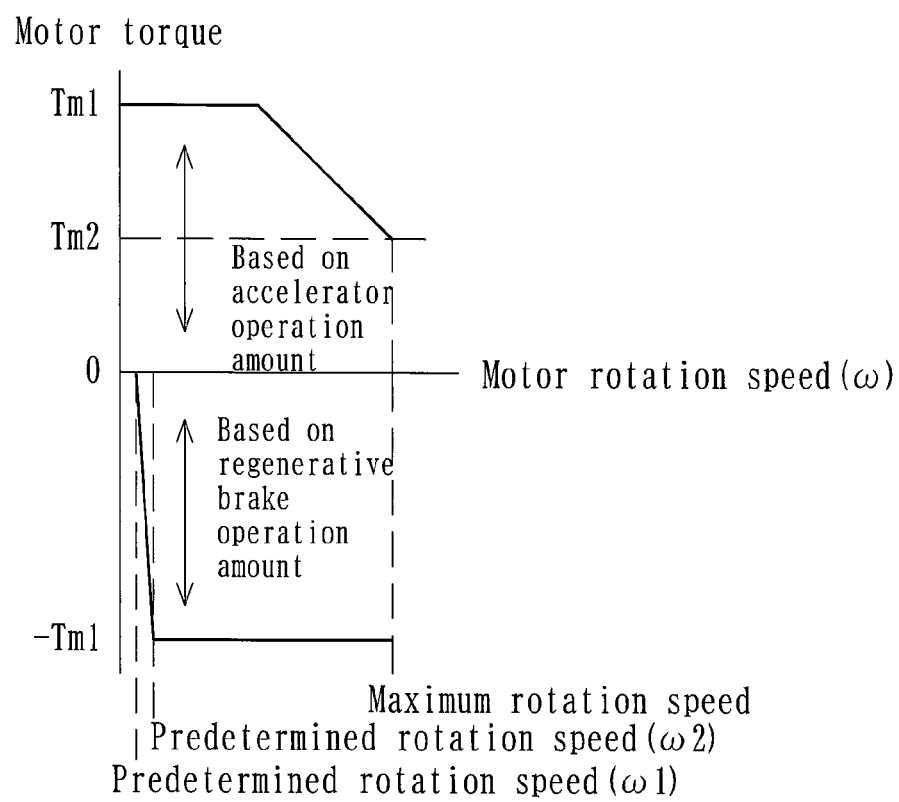

[ Fig. 9 ]
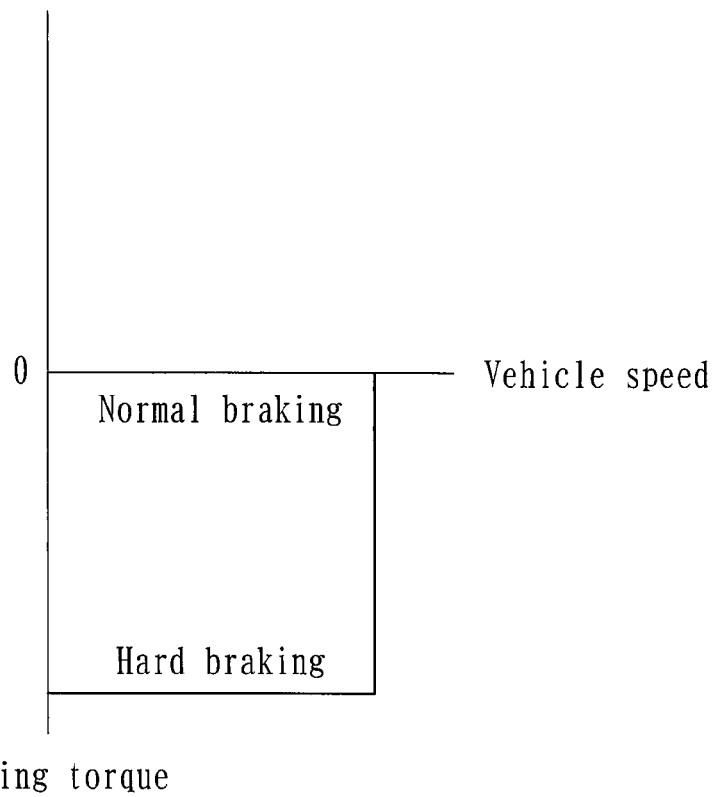
[ Fig. 10 ]
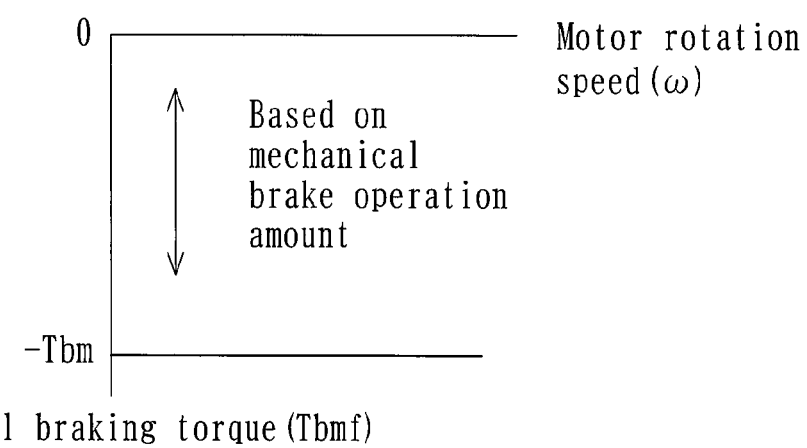

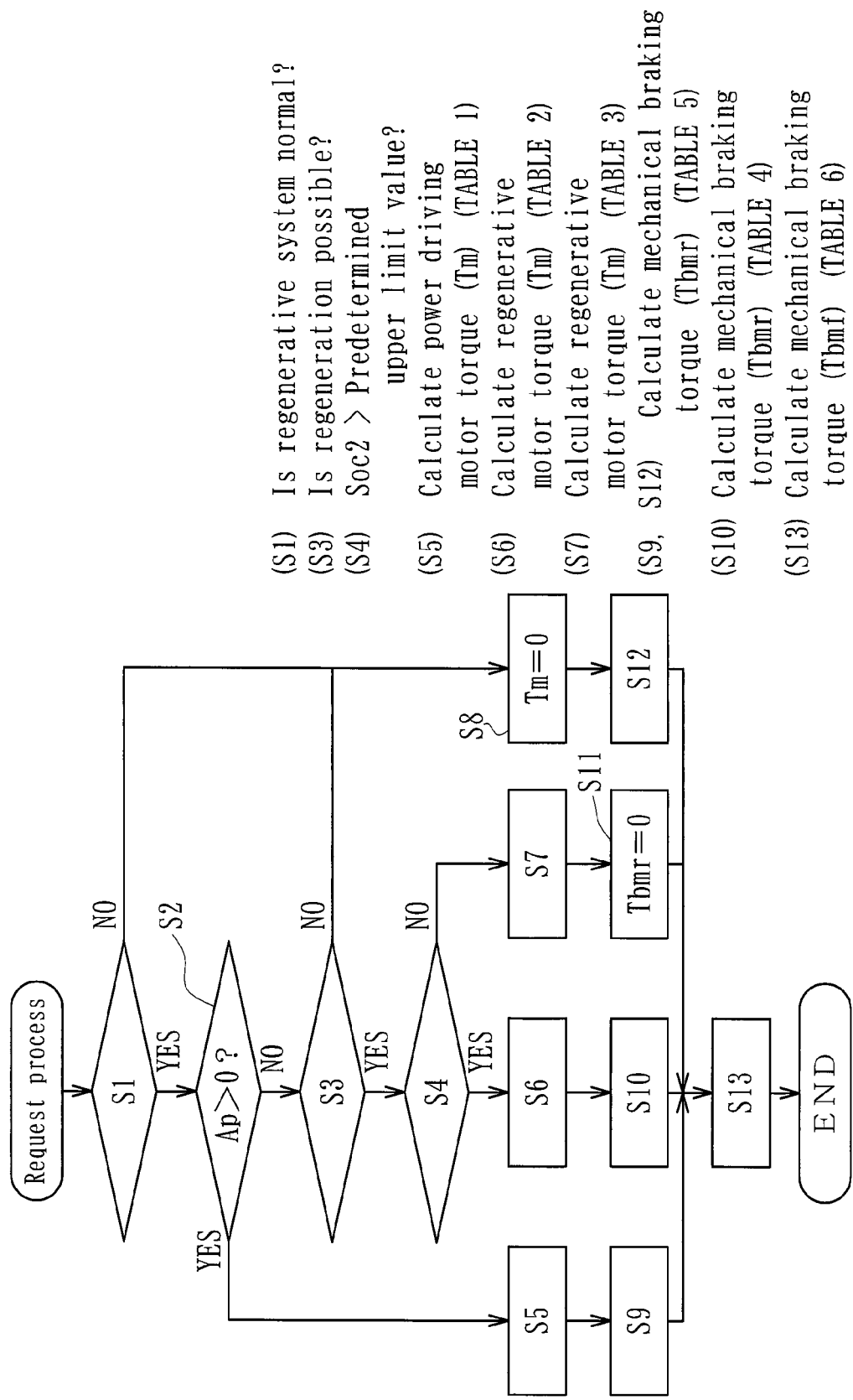
[Fig. 11]

[ Fig. 12 ]
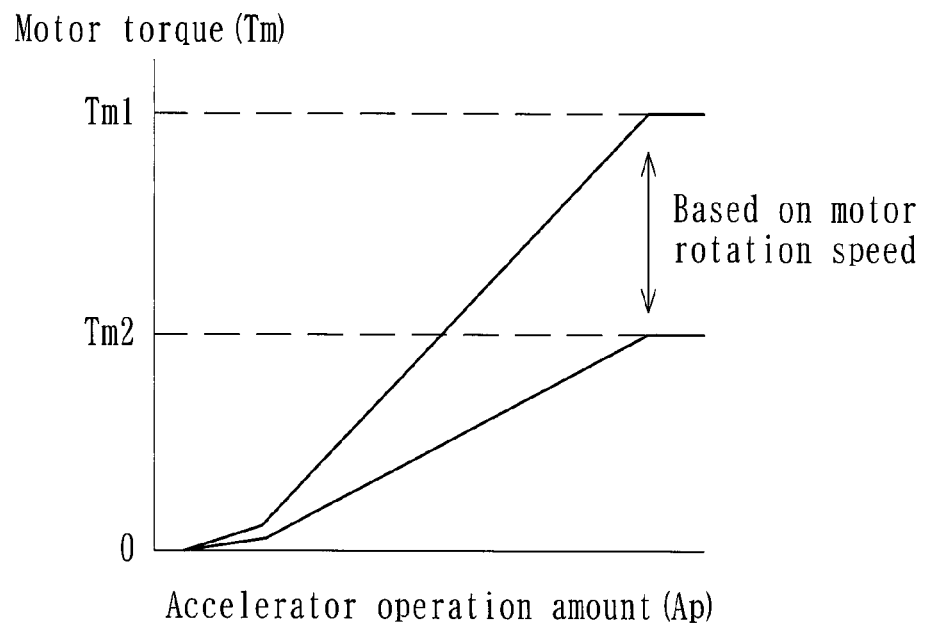
[ Fig. 13 ]
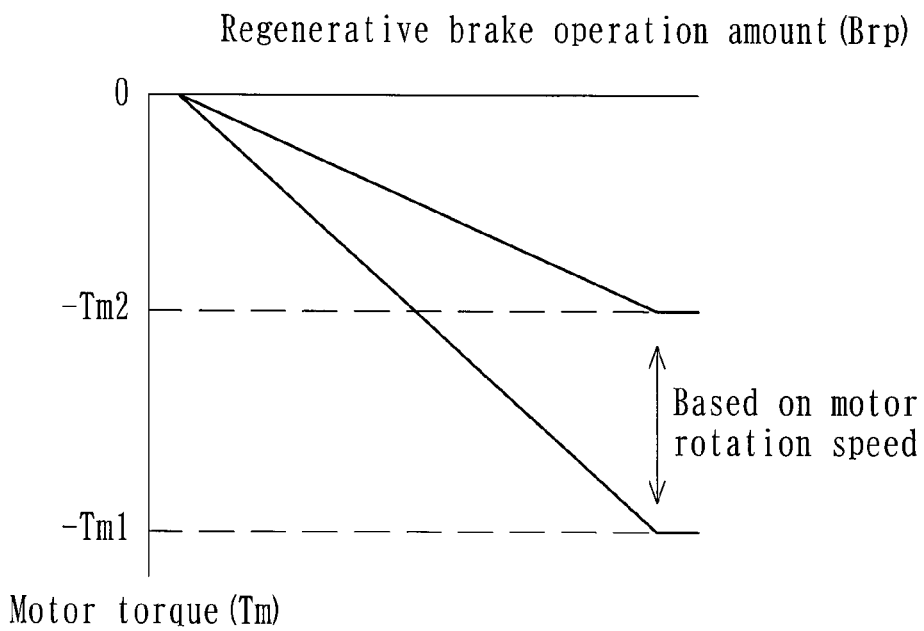

[ Fig. 14 ]
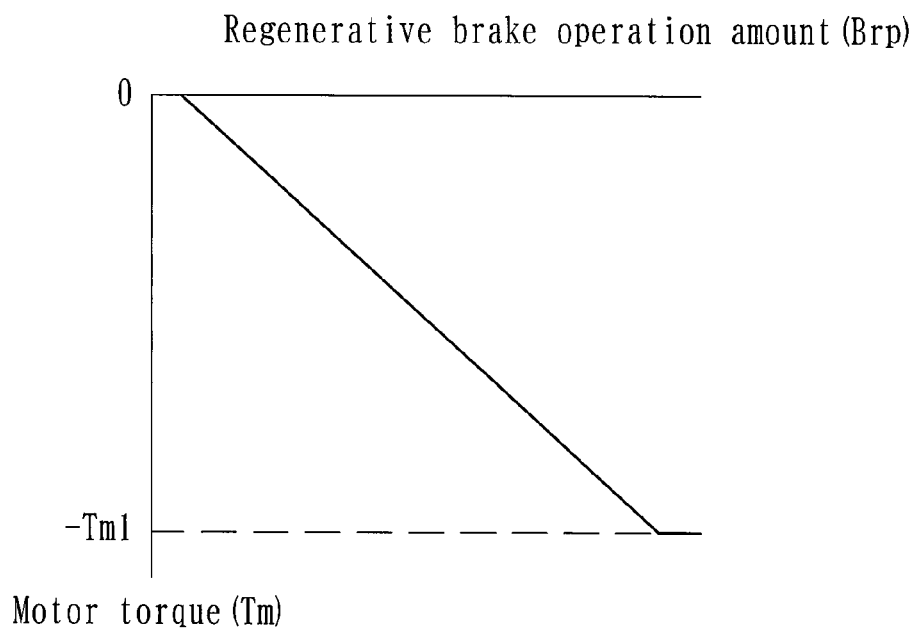
[ Fig. 15 ]
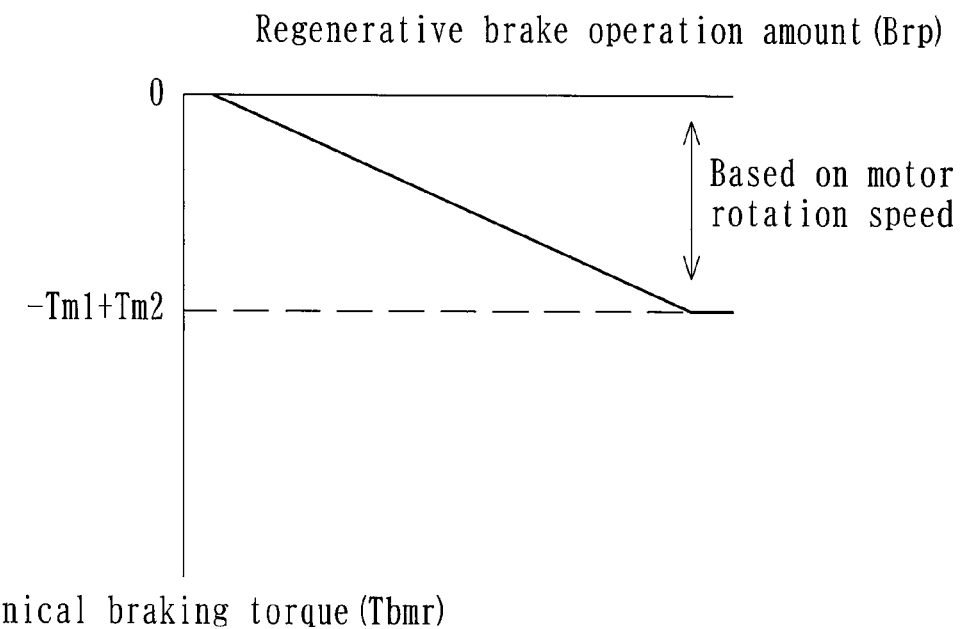

[ Fig. 16 ]
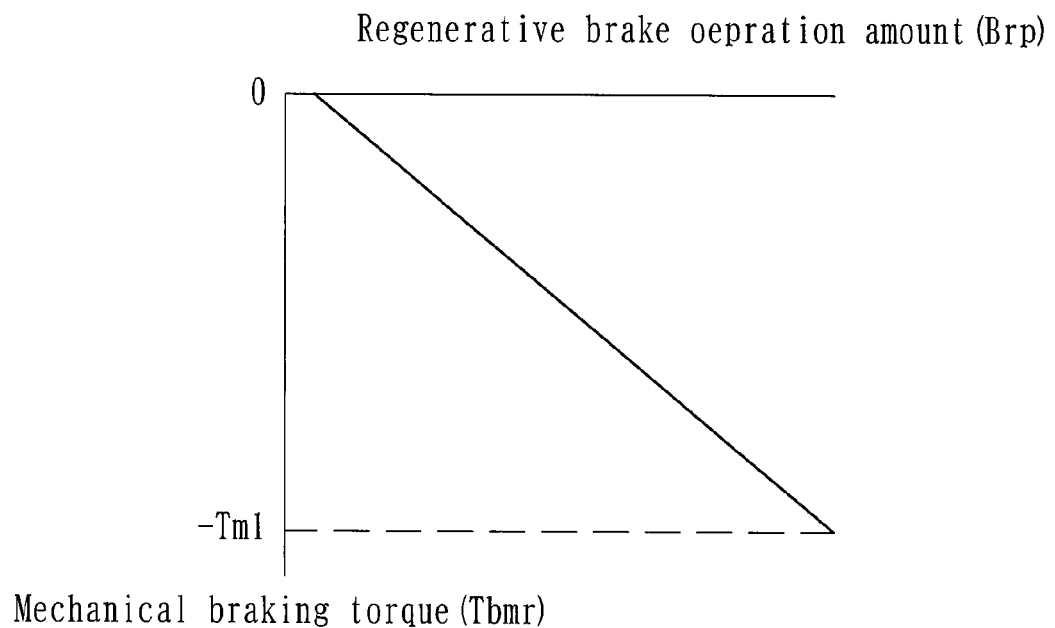
[ Fig. 17 ]
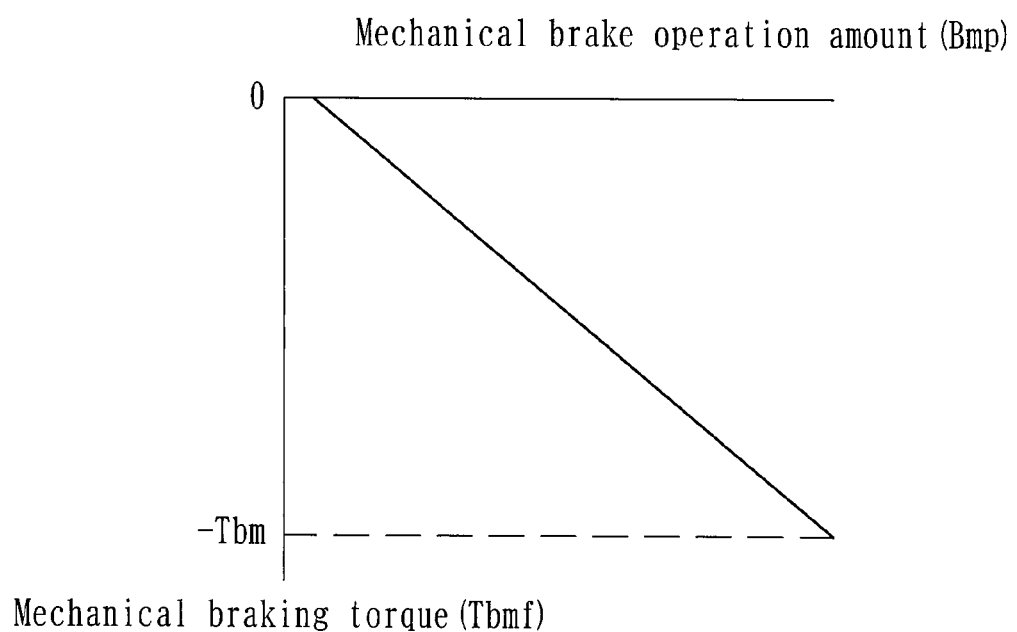

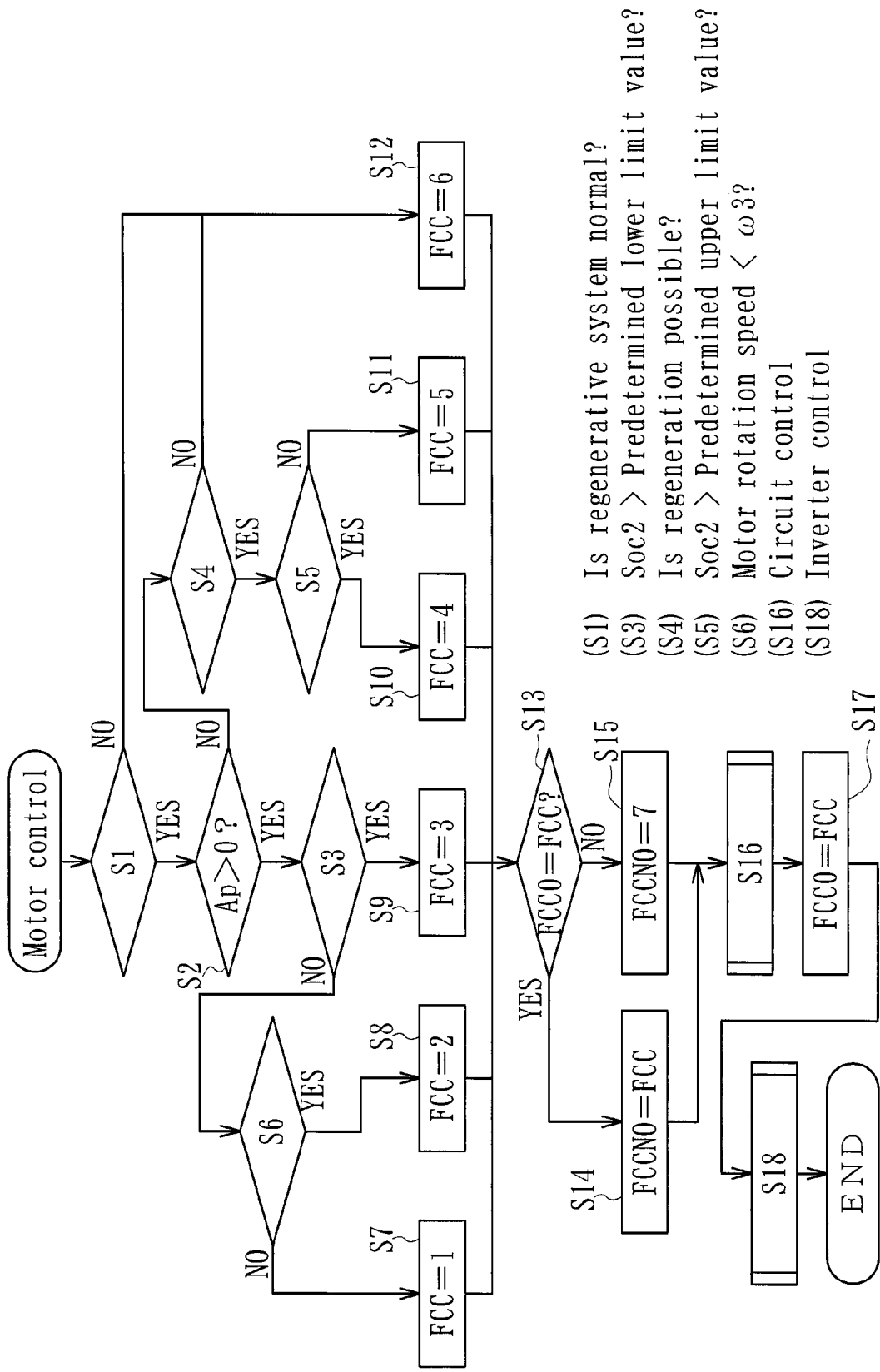
[Fig. 18]

[ Fig. 19 ]

| Motor control | Circuit control mode | | | | SW | | | | | Remarks |
|---|---|---|---|---|---|---|---|---|---|---|
| | FCCNO | Power converter | Capacitor series connection | Inverter voltage | S1 | S2 | S3 | S4 | Sa | |
| Power driving | 1 | OFF | × | Vinv=Vdc | off | off | off | off | on | |
| Power driving | 2 | Step down for power driving | × | Vinv=V1<Vdc | duty | duty | on | off | off | Vinv characteristics: Table A |
| Power driving | 3 | Step down for power driving | ○ | Vinv=V1+Vc | duty | duty | off | on | off | Vinv characteristics: Table A |
| Regeneration | 4 | Step up for regeneration | × | Vinv=V1<Vdc | duty | duty | on | off | off | Vinv characteristics: Table B |
| Regeneration | 5 | Step up for regeneration | ○ | Vinv=V1+Vc | duty | duty | off | on | off | Vinv characteristics: Table C |
| Stop | 6 | OFF | × | | off | off | off | off | off | |
| Switching | 7 | Transient | | | duty | duty | off | off | off | |

[Fig. 20]
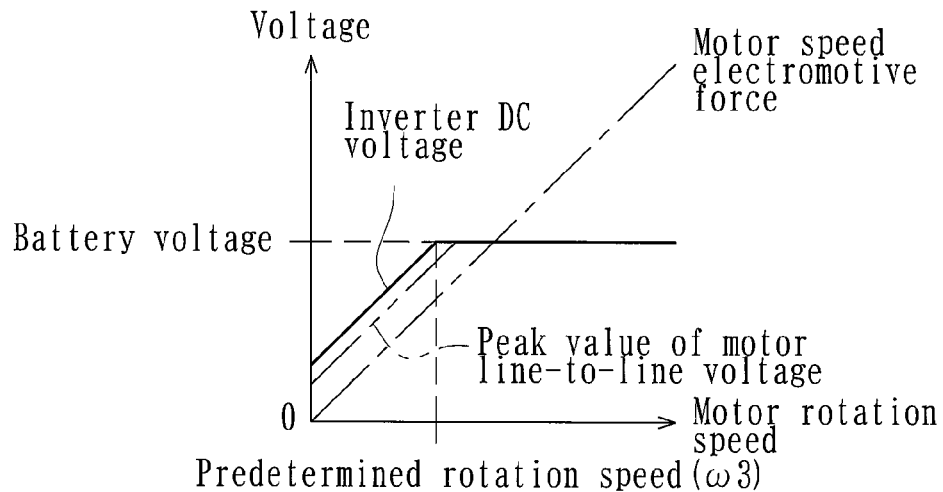
[Fig. 21]
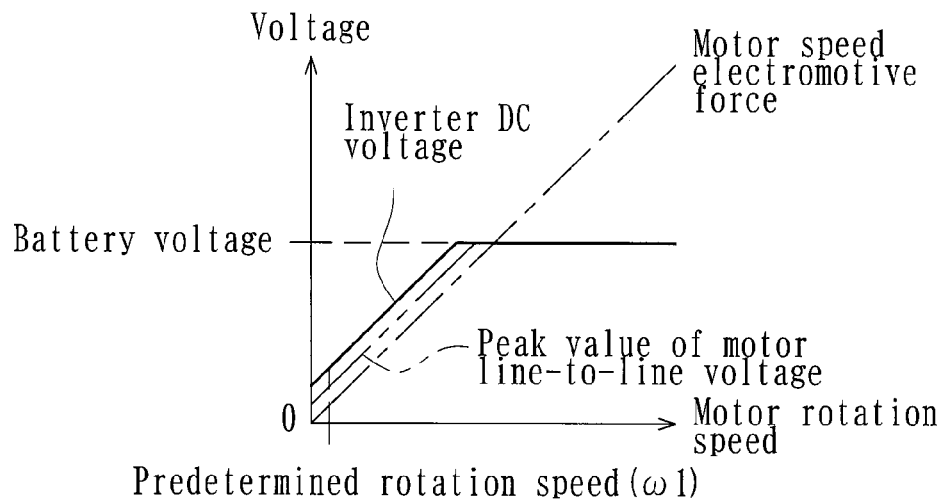
[Fig. 22]
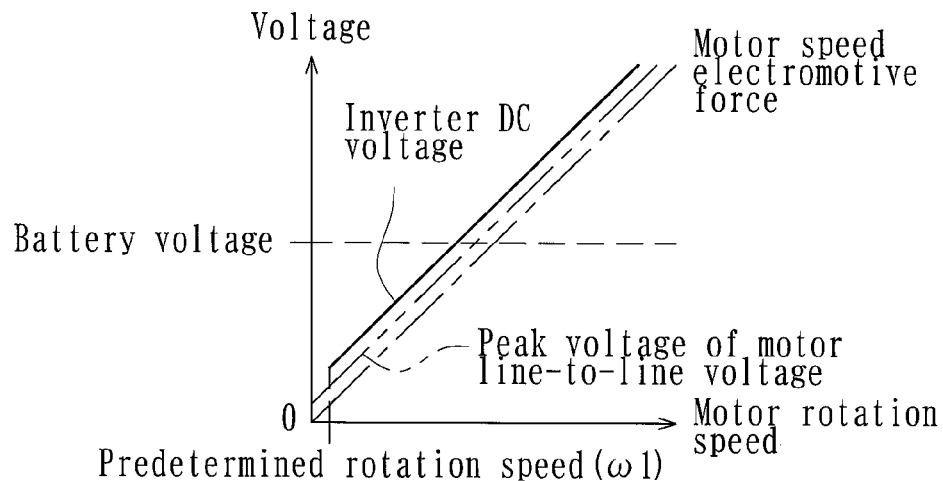

[Fig. 23]
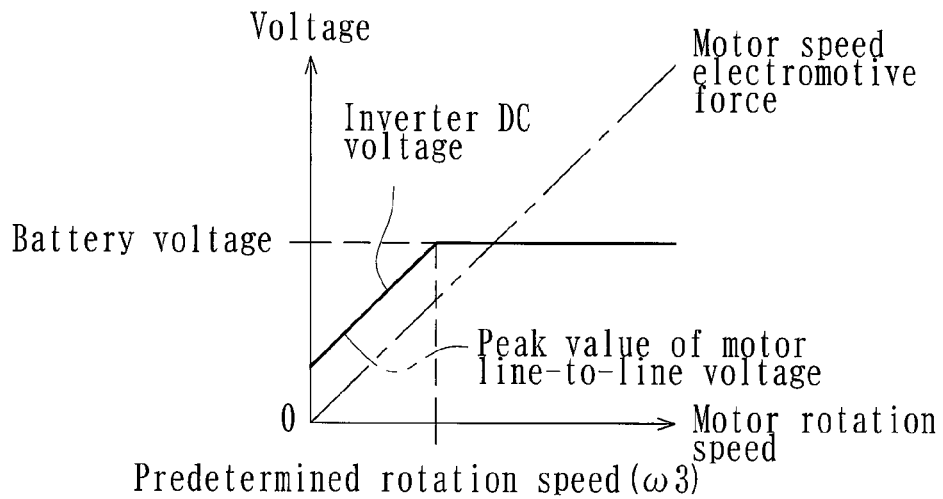
[Fig. 24]
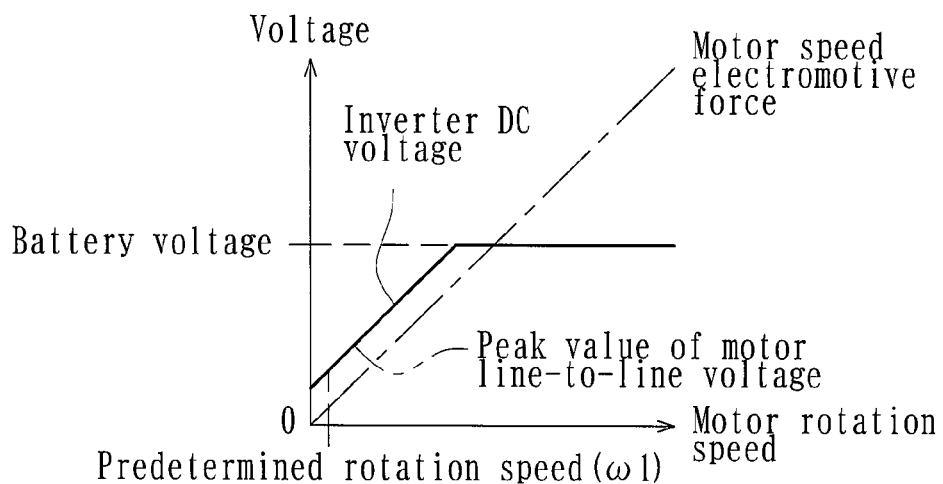
[Fig. 25]
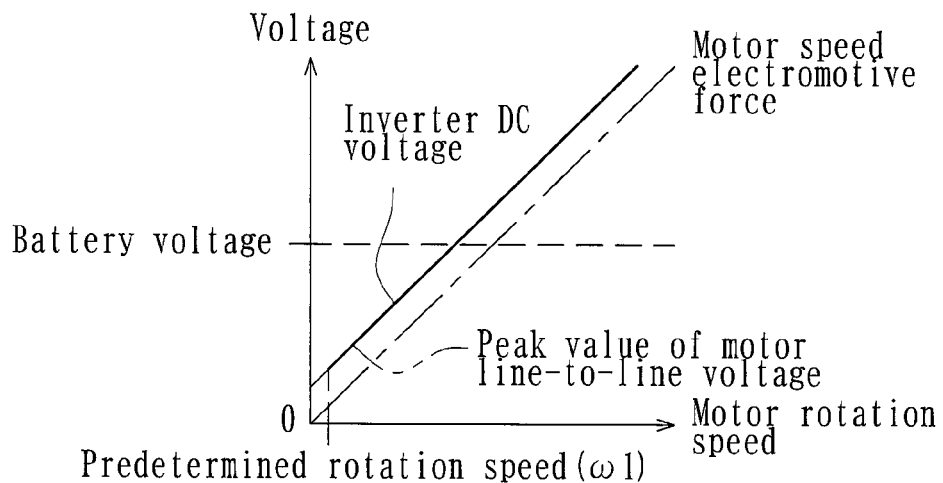

[ Fig. 26 ]
Switching operation of the inverter circuit
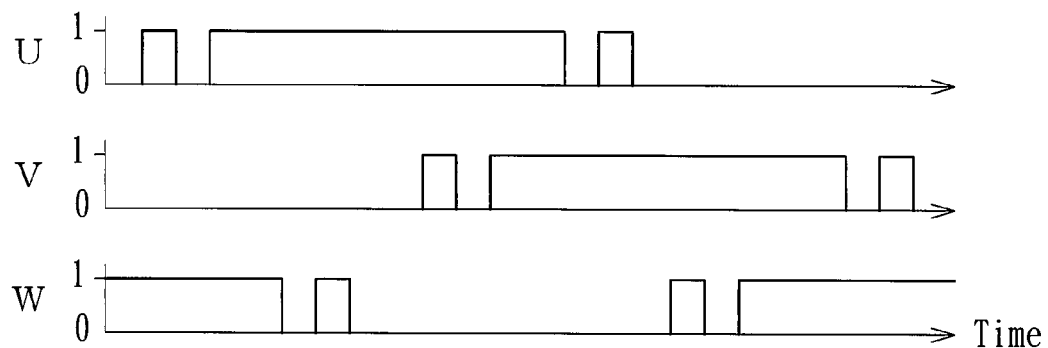
Motor line-to-line voltage
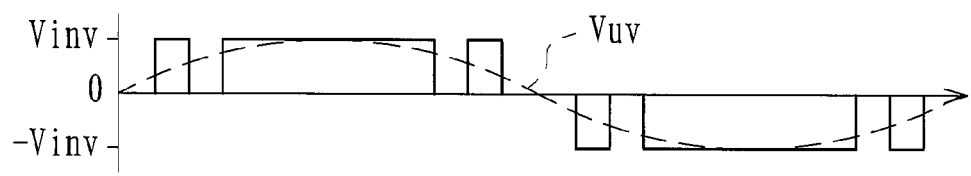
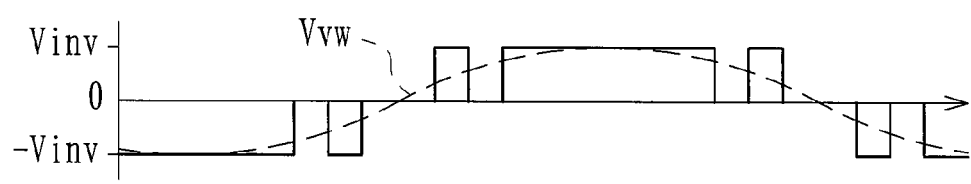
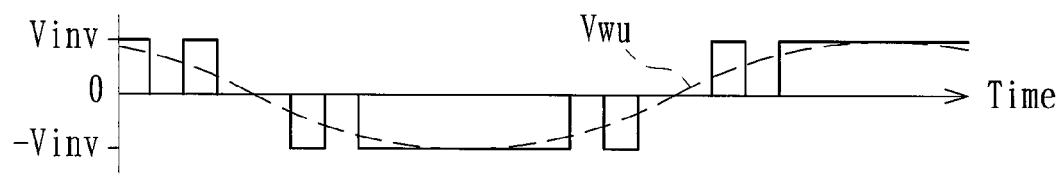
——— Fundamental wave of motor line-to-line voltage

[Fig. 27]
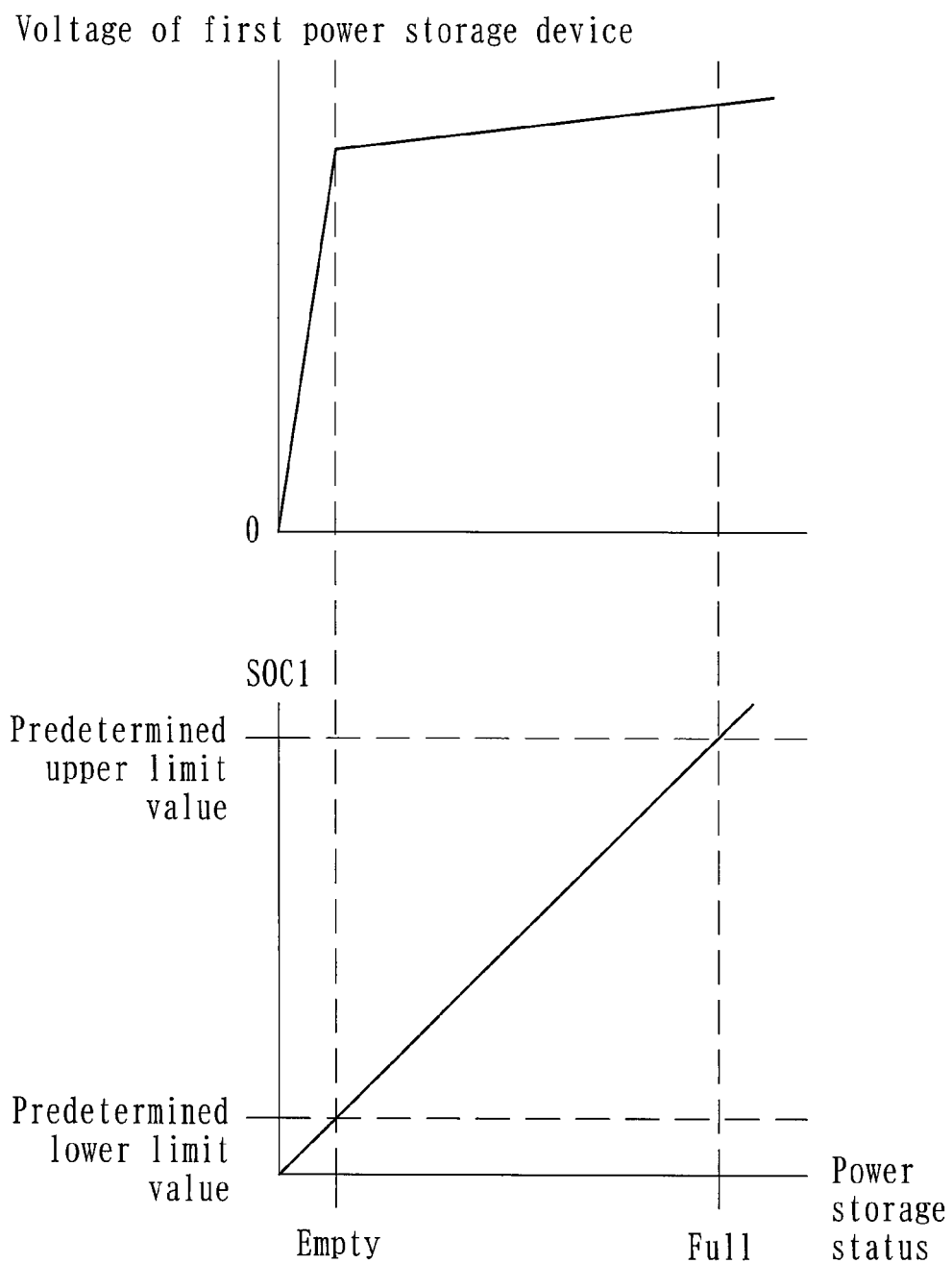

[ Fig. 28 ]
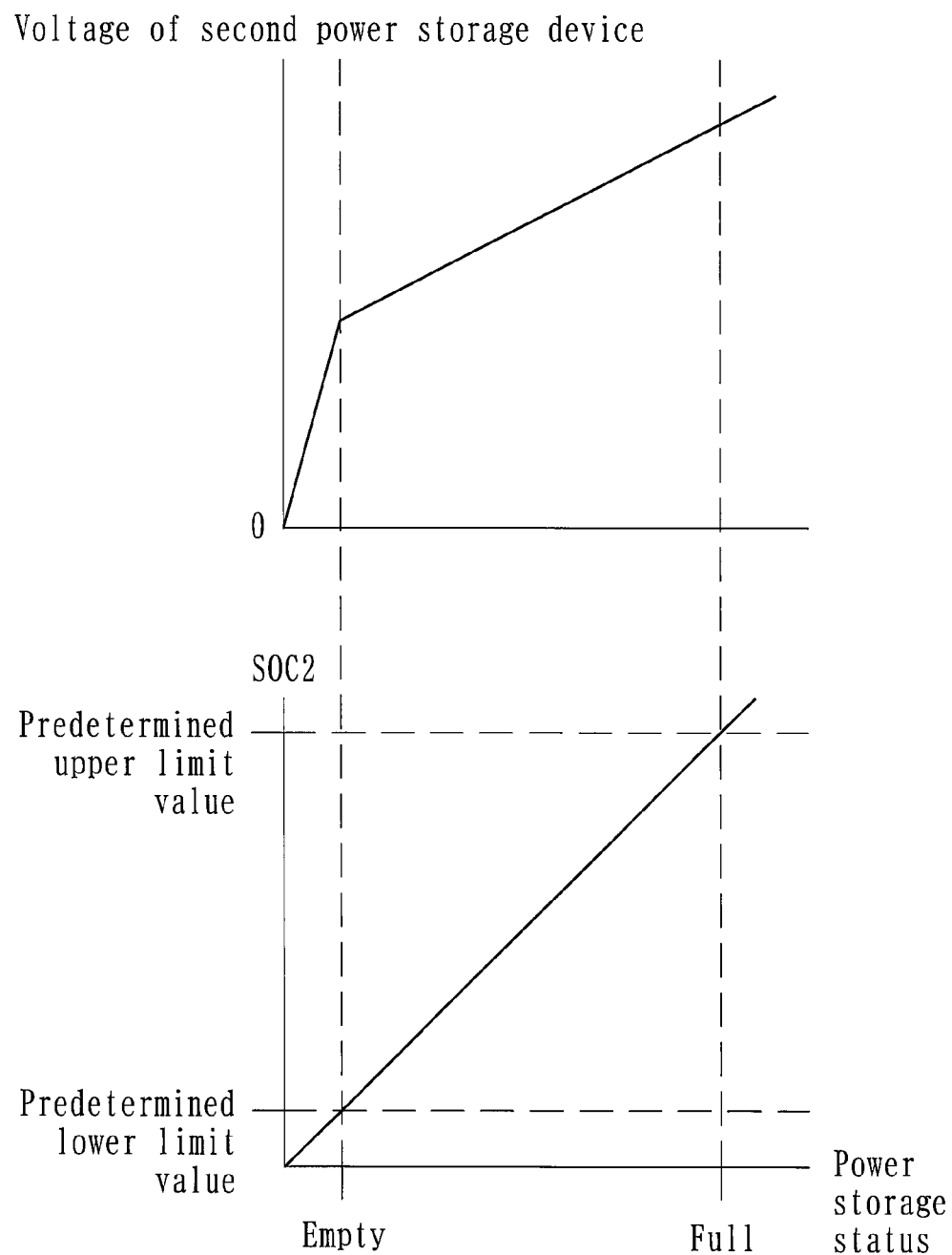

[ Fig. 29 ]

| | Combination | Second power storage device: High-power power supply | | | |
|---|---|---|---|---|---|
| | | (3) High-power lithium ion battery | (4) High-power nickel-metal hydride battery | (5) Lithium ion capacitor | (6) Electric double layer capacitor |
| First power storage device: Large-capacity power supply | (1) Large-capacity lithium ion battery | ○ | ○ | ○ | ○ |
| | (2) Large-capacity nickel-metal hydride battery | ○ | ○ | ○ | ○ |

MOTOR VEHICLE

CROSS-REFERENCE TO RELATED APPLICATION

This application claims priority to Japanese Application No. 2020-194409, filed Nov. 24, 2020. The disclosure of the above application is incorporating herein by reference.

FIELD

The present disclosure relates to a motor vehicle including a motor performing power driving and regeneration and, more particularly, to a power storage device suppling energy to the motor in a driving mode and restoring energy from motor in a regeneration mode.

BACKGROUND

A motor bicycle described in Japanese Unexamined Patent Application Publication No. 2002-84780 is an example of a motor vehicle including a motor configured to perform power driving and regeneration. A power storage device is configured to supply energy to the motor. The motor vehicle can obtain a thrust by a drive force of the motor, and recover the energy into the power storage device by adjusting a braking torque of a driving wheel. According to this motor vehicle, the energy recovered during braking can be stored in the power storage device (battery) and used as drive energy during the power driving.

In the related art described above, however, a motor electromotive voltage decreases in a low-speed rotation range of the motor. Therefore, regenerative braking cannot be used. The motor electromotive voltage increases in a high-speed rotation range of the motor, thereby requiring field weakening control to suppress an inverter DC voltage. Thus, the maximum braking torque of the regenerative braking decreases. During the regenerative braking, there is a possibility that a braking force intended by a driver cannot be obtained by the regenerative braking.

SUMMARY

The present disclosure provides a motor vehicle where a braking torque intended by a driver can be generated by regenerative braking over a wide rotation range of a motor. Thus, when the rotation speed of the motor is equal to or higher than a predetermined value, a predetermined braking torque, based on an operation amount of a regenerative brake operator, is generated by the regenerative braking.

According to a first aspect of the disclosure, a motor vehicle include a motor configured to perform power driving and regeneration. An inverter converts a direct current into an alternating current. A mechanical brake performs braking by releasing energy. A power storage device supplies energy to the motor. An accelerator operator controls the motor to adjust a drive torque of a driving wheel. A mechanical brake operator controls the mechanical brake to adjust a braking torque. A regenerative brake operator controls the motor to adjust a braking torque of the driving wheel and recovers the energy into the power storage device. A detector detects a rotation speed of the motor. When the rotation speed of the motor is equal to or higher than a predetermined value, a predetermined braking torque, based on an operation amount of the regenerative brake operator, is generated by regenerative braking.

According to a second aspect of the disclosure, a maximum value of the predetermined braking torque, during the regeneration in the motor, may be a rated torque of the motor.

According to a third aspect of the disclosure, the motor vehicle may further include a power converter with a voltage step down function during the power driving and a voltage step up function during the regeneration. The energy may be recovered via the power converter during the regeneration.

According to a fourth aspect of the disclosure, when the rotation speed of the motor is lower than the predetermined value, the braking torque may be generated by the mechanical brake based on the operation amount of the regenerative brake operator.

According to a fifth aspect of the disclosure, the power storage device may include a first power storage device, with a large-capacity characteristic, and a second power storage device, with a high-power characteristic. The motor vehicle may further include a circuit where the power converter, with the voltage step down function during the power driving, is connected to the first power storage device. The second power storage device is connected in series between a reactor of the power converter and the inverter. The energy may be recovered into the first power storage device and the second power storage device by using the circuit during the regeneration mode.

According to a sixth aspect of the disclosure, when a charge level of the first power storage device is equal to or higher than a predetermined value, the braking torque may be generated by the mechanical brake based on the operation amount of the regenerative brake operator.

According to a seventh aspect of the disclosure, the motor vehicle may be a saddled vehicle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a schematic view of a motor vehicle.

FIG. 2 is a circuit diagram of a power conversion device of the motor vehicle.

FIG. 3 is a conceptual diagram of the power conversion device of the motor vehicle.

FIG. 4 is a schematic diagram of control relationships in the motor vehicle.

FIG. 5 is a time chart diagram of power control in the motor vehicle.

FIG. 6 is a flowchart of the overall power control in the motor vehicle.

FIG. 7 is a graph of request characteristics of the motor vehicle (vehicle requests on a driving wheel).

FIG. 8 is a graph of request characteristics of the motor vehicle (motor requests on the driving wheel).

FIG. 9 is a graph of request characteristics of the motor vehicle (vehicle requests on a driven wheel).

FIG. 10 is a graph of request characteristics of the motor vehicle (brake requests on the driven wheel).

FIG. 11 is a flowchart of request process control in the power control of the motor vehicle.

FIG. 12 is a graph of a driver's request table of the motor vehicle (Table 1).

FIG. 13 is a graph of a driver's request table of the motor vehicle (Table 2).

FIG. 14 is a graph of a driver's request table of the motor vehicle (Table 3).

FIG. 15 is a graph of a driver's request table of the motor vehicle (Table 4).

FIG. 16 is a graph of a driver's request table of the motor vehicle (Table 5).

FIG. 17 is a graph of a driver's request table of the motor vehicle (Table 6).

FIG. 18 is a flowchart of motor control in the power control of the motor vehicle.

FIG. 19 is a table of power conversion circuit control of the motor vehicle.

FIG. 20 is a graph of a voltage request table of the motor vehicle (Table A in a case of PWM).

FIG. 21 is a graph of a voltage request table of the motor vehicle (Table B in the case of PWM).

FIG. 22 is a graph of a voltage request table of the motor vehicle (Table C in the case of PWM).

FIG. 23 is a graph of a voltage request table of the motor vehicle (Table A in a case depending on a peak value of a motor line-to-line voltage).

FIG. 24 is a graph of a voltage request table of the motor vehicle (Table B in the case depending on the peak value of the motor line-to-line voltage).

FIG. 25 is a graph of a voltage request table of the motor vehicle (Table C in the case depending on the peak value of the motor line-to-line voltage).

FIG. 26 is a time chart of an example of an operation depending on a peak value of a motor line-to-line voltage in a motor vehicle according to another embodiment.

FIG. 27 is a graph of a power storage status of a first power storage device of the motor vehicle.

FIG. 28 is a graph of a power storage status of a second power storage device of the motor vehicle.

FIG. 29 is a table of combinations of power storage devices of the motor vehicle.

DETAILED DESCRIPTION

Embodiments of the present disclosure are described below in detail with reference to the drawings.

A motor vehicle according to each of the embodiments is a saddled vehicle, such as a motorcycle traveling by using a drive force of a motor. As illustrated in FIGS. 1 to 4, the motor vehicle includes a motor 1, an inverter 2, mechanical brakes (3a, 3b), a first power storage device 4, a second power storage device 5, an accelerator operator 6, a mechanical brake operator 7, a regenerative brake operator 8, a power converter 10, an ECU 11, a start switch 12, and a monitor 13 (auxiliary device).

The motor 1 is an electromagnetic motor that obtains a drive force by an energy supply. As illustrated in FIGS. 2 and 3, the motor 1 is electrically connectable to the second power storage device 5, the power converter 10, and the first power storage device 4, via the inverter 2. The motor 1 performs power driving and regeneration. The inverter 2 (DC-AC inverter) converts a direct current into an alternating current. In this embodiment, the inverter 2 converts a direct current of the first power storage device 4 or the second power storage device 5 into an alternating current. The inverter 2 supplies the alternating current to the motor 1.

The mechanical brakes perform braking by releasing energy, as typified by a disc brake or a drum brake. The mechanical brakes are a driving wheel mechanical brake 3a performing braking by releasing kinetic energy of a driving wheel Ta. A driven wheel mechanical brake 3b performs braking by releasing kinetic energy of a driven wheel Tb. The driving wheel mechanical brake 3a and the driven wheel mechanical brake 3b are connected to the mechanical brake operator 7, via a brake actuator 9.

The mechanical brake operator 7 controls the mechanical brake (driven wheel mechanical brake 3b) to adjust a braking torque. In this embodiment, an operation lever is attached to the right end of a handle bar. Based on an operation amount of the mechanical brake operator 7, a mechanical brake controller 18 (see FIG. 4) may operate the brake actuator 9 to actuate the driven wheel mechanical brake 3b.

The accelerator operator 6 controls the motor 1 to adjust a drive torque of the driving wheel Ta. In this embodiment, an accelerator grip is attached to the right end of the handle bar. As illustrated in FIG. 4, based on an operation amount of the accelerator operator 6, an inverter controller 16 may estimate a torque request and operate the motor 1 to obtain a desired drive force. The inverter controller 16 is one controller provided in the ECU 11.

The power storage devices are configured to supply energy to the motor 1. In this embodiment, the power storage devices are the first power storage device 4 and the second power storage device 5. The first power storage device 4 is a storage battery with a large-capacity characteristic. As illustrated in FIG. 29, examples of the first power storage device 4 include a large-capacity lithium ion battery and a large-capacity nickel-metal hydride battery. The second power storage device 5 is a storage battery with a high-power characteristic. As illustrated in FIG. 29, examples of the second power storage device 5 include a high-power lithium ion battery, a high-power nickel-metal hydride battery, a lithium ion capacitor, and an electric double layer capacitor.

The regenerative brake operator 8 controls the motor 1 to adjust a braking torque of the driving wheel Ta and recover the energy into the power storage devices, first power storage device 4 and second power storage device 5. In this embodiment, an operation lever is attached to the left end of the handle bar. Based on an operation amount of the regenerative brake operator 8, the motor 1 performs regeneration to obtain a desired braking force. Through the regeneration in the motor 1, the energy can be recovered into the first power storage device 4 and the second power storage device 5.

The power converter 10 has a voltage step down function during the power driving of the motor 1, during energy supply to the motor 1. Also, it has a voltage step up function during the regeneration of the motor 1, during energy recovery from the motor 1. As illustrated in FIGS. 2 and 3, the power converter 10 is connected between the first power storage device 4 and the second power storage device 5 in an electric circuit. More specifically, as illustrated in FIG. 2, the power converter 10 includes two semiconductor switching elements (MOSFETs) 10a and 10b and a reactor 10c (coil). The semiconductor switching elements 10a and 10b include switches S1 and S2 and their body diodes, respectively.

In the power converter 10, according to this embodiment, the switches S1 and S2 of the semiconductor switching elements 10a and 10b are subjected to high-speed switching (duty control). This steps down the voltage during the power driving of the motor 1 (when a current flows rightward in FIG. 3) because the reactor 10c is located on a downstream side of the semiconductor switching elements 10a and 10b. The voltage is stepped up during the regeneration in the motor 1 (when the current flows leftward in FIG. 3) because the reactor 10c is located on an upstream side of the semiconductor switching elements 10a and 10b.

More specifically, this embodiment provides, as illustrated in FIGS. 2 and 3, a circuit where the power converter 10, with the voltage step down function during the power driving, is connected to the first power storage device 4. The second power storage device 5 is connected in series between the reactor 10c of the power converter 10 and the inverter 2. During the power driving of the motor 1, the power converter 10 steps down an output voltage (Vdc) of the first power storage device 4 to supply energy from the first power storage device 4 and the second power storage device 5 to the inverter 2. During the regeneration of the motor 1, the power converter 10 steps up the resultant output voltage (Vinv-Vc) of the combination between the inverter 2 and second power storage device 5 to recover the energy into the first power storage device 4 and the second power storage device 5.

As illustrated in FIG. 2, this embodiment provides a first switch S3 connecting the power converter 10 and the inverter 2 without intervention of the second power storage device 5. A second switch S4 connects the power converter 10 and the inverter 2, via the second power storage device 5. The circuit of this embodiment includes a switch Sa to be turned ON when the power converter 10 is OFF. Stabilization capacitors Ca and Cb are connected to the circuit. The first switch S3 and the second switch S4, according to this embodiment, are formed in semiconductor switching elements (MOSFETs) 14 and 15 (including their body diodes similarly to the semiconductor switching elements 10a and 10b), respectively.

The ECU 11 controls the motor 1 in response to input driver's requests. As illustrated in FIG. 4, the ECU 11 includes the inverter controller 16, a circuit controller 17, and the mechanical brake controller 18, and is connected to the inverter 2, the power converter 10, the first power storage device 4, the second power storage device 5, and the brake actuator 9. The ECU 11 is configured to detect voltages of the first power storage device 4 and the second power storage device 5. The ECU 11 makes determination on power storage statuses of the first power storage device 4 and the second power storage device 5 based on the voltages. FIG. 27 illustrates the power storage status of the first power storage device 4. FIG. 28 illustrates the power storage status of the second power storage device 5.

When the power storage status of the second power storage device 5 is equal to or lower than a predetermined lower limit value (see FIG. 28), during the power driving of the motor 1, the first switch S3 is turned ON and the second switch S4 is turned OFF to supply energy from the first power storage device 4 to the inverter 2 while stepping down the output voltage (Vdc) of the first power storage device 4. When the power storage status of the second power storage device 5 is equal to or higher than a predetermined upper limit value (see FIG. 28), during the regeneration in the motor 1, the first switch S3 is turned ON and the second switch S4 is turned OFF to store regeneration energy in the first power storage device 4 while stepping up a DC voltage (Vinv) of the inverter 2.

The start switch 12 is an operation switch that allows the vehicle to travel. By operating the accelerator operator 6 after the start switch 12 is operated, the motor 1 may be actuated for traveling. The monitor 13 is an auxiliary device such as a liquid crystal monitor attached to the vehicle. For example, the monitor 13 may display conditions of the vehicle (speed, power storage status, or whether malfunction has occurred) or a map of a navigation system.

As illustrated in FIG. 4, this embodiment provides a detector 19, a sensor detecting a rotation speed of the motor 1. When the rotation speed of the motor 1, detected by the detector 19, is equal to or higher than a predetermined value, a predetermined braking torque, based on an operation amount of the regenerative brake operator 8, is generated by regenerative braking (particularly in this embodiment, generated only by the regenerative braking). The maximum value of the predetermined braking torque during the regeneration in the motor 1 is a rated torque of the motor 1.

When the rotation speed of the motor 1, detected by the detector 19, is lower than the predetermined value, a braking torque is generated by the mechanical brake (driving wheel mechanical brake 3a) based on the operation amount of the regenerative brake operator 8. When the charge level of the first power storage device 4 is equal to or higher than a predetermined value, a braking torque is generated by the mechanical brake (driving wheel mechanical brake 3a) based on the operation amount of the regenerative brake operator 8.

According to the embodiment, FIG. 5 illustrates changes in parameters in a case where the accelerator operator 6 and the regenerative brake operator 8 are operated after the start switch 12 is turned ON in the motor vehicle. In particular, a capacitor current (Ic) and a capacitor charge level (SOC2) are a current and a charge level of the second power storage device 5 of this embodiment, and a battery current (Idc) and a battery charge level (SOC1) are a current and a charge level of the first power storage device 4 of this embodiment. In a table in FIG. 5, "function circuit control number" (FCCNO) corresponds to "FCCNO" in FIGS. 4, 18, and 19.

Next, control on the motor vehicle (main control), according to this embodiment, is described with reference to a flowchart of FIG. 6.

In S1, determination is first made as to whether the start switch 12 is ON. When determination is made that the start switch 12 is ON, determination is made in S2 as to whether a charge status (Soc1) of the first power storage device 4 is higher than a predetermined lower limit value (see FIG. 27). When determination is made that the charge status (Soc1) is higher than the predetermined lower limit value, a request process (S3), motor control (S4), and mechanical brake control (S5) are performed sequentially.

Next, request characteristics of the motor vehicle according to this embodiment are described with reference to FIGS. 7 to 10.

The characteristics illustrated in FIG. 7 show the relationship between a vehicle speed and both of the drive torque and the braking torque of the driving wheel Ta. The characteristics illustrated in FIG. 8 show the relationship between a motor torque of the driving wheel Ta and a rotation speed ($\omega$) of the motor 1. Particularly in a case of high-speed traveling, FIG. 7 illustrates relationships where the drive torque gradually decreases and the braking torque is constant relative to the vehicle speed. In FIG. 8, a positive side (upper half) from the vertical axis shows a drive torque based on an operation amount of the accelerator operator 6. A negative side (lower half) from the vertical axis shows a braking torque based on an operation amount of the regenerative brake operator 8. In FIG. 8, reference symbol Tm1 represents the rated torque of the motor 1.

The characteristics illustrated in FIG. 9 show the relationship between the vehicle speed and a braking torque of the driven wheel Tb. The characteristics illustrated in FIG. 10 show the relationship between a braking torque of the driven wheel Tb (mechanical braking torque (Tbmf)) and the rotation speed ($\omega$) of the motor 1. Since FIGS. 9 and 10 illustrate the characteristics of the driven wheel Tb, only a negative side (lower half) from the vertical axis shows the characteristics (braking torques).

Next, control on the motor vehicle (request process control), according to this embodiment, is described with reference to a flowchart of FIG. 11.

In S1, determination is first made as to whether the regenerative system is normal based on whether a malfunction signal is generated. When determination is made that the malfunction signal is not generated, determination is made in S2 as to whether the accelerator operator 6 is operated (whether an accelerator operation amount Ap is larger than 0). When determination is made that the accelerator operator 6 is operated larger than 0, the process proceeds to S5 for motor driving mode. A motor torque (Tm), based on the operation amount of the accelerator operator 6, is calculated with reference to Table 1 illustrated in FIG. 12.

After the calculation in S5, the process proceeds to S9 (driving wheel mechanical break). A mechanical braking torque (Tbmr), based on an operation amount of the regenerative brake operator 8, is calculated with reference to Table 5 illustrated in FIG. 16. Then, the process proceeds to S13 (driven wheel mechanical break). A mechanical braking torque (Tbmf), based on an operation amount of the mechanical brake operator 7, is calculated with reference to Table 6 illustrated in FIG. 17. The mechanical braking torque (Tbmr) calculated in S9 is the braking torque of the driving wheel Ta. The mechanical braking torque (Tbmf) calculated in S13 is the braking torque of the driven wheel Tb.

When determination is made in S2 that the accelerator operator is not operated, determination is made in S3 as to whether the regeneration in the motor 1 is possible. In S3, determination is made that the regeneration in the motor 1 is possible when the power storage status (Soc1) of the first power storage device 4 is equal to or lower than a predetermined upper limit value (see FIG. 27) and the rotation speed of the motor is equal to or higher than $\omega1$ (see FIG. 8). When determination is made that the regeneration in the motor 1 is possible, determination is made in S4 as to whether the power storage status (Soc2) of the second power storage device 5 is higher than the predetermined upper limit value (see FIG. 28).

When determination is made in S4 that the power storage status (Soc2) of the second power storage device 5 is higher than the predetermined upper limit value (see FIG. 28), the process proceeds to S6 (power regeneration to only first storage device). A motor torque (Tm), based on the operation amount of the regenerative brake operator 8, is calculated with reference to Table 2, illustrated in FIG. 13. In the calculation of the motor torque (Tm), with reference to Table 2, when the rotation speed of the motor 1 is equal to or lower than a predetermined rotation speed ($\omega2$), illustrated in FIG. 8, a correction is made such that $Tm=Tm(\omega-\omega1)/(\omega2-\omega1)$. After the calculation in S6, the process proceeds to S10. A mechanical braking torque of driving wheel (Tbmr), based on the operation amount of the regenerative brake operator 8, is calculated with reference to Table 4, illustrated in FIG. 15. Then, S13 is sequentially performed as described above.

When determination is made in S4 that the power storage status (Soc2) of the second power storage device 5 is not higher than the predetermined upper limit value (see FIG. 28), the process proceeds to S7. A motor torque (Tm), based on the operation amount of the regenerative brake operator 8, is calculated with reference to Table 3, illustrated in FIG. 14. In the calculation of the motor torque (Tm), with reference to Table 3, when the rotation speed of the motor 1 is equal to or lower than the predetermined rotation speed ($\omega2$) illustrated in FIG. 8, a correction is made such that $Tm=Tm(\omega-\omega1)/(\omega2-\omega1)$, similarly to Table 2. After the calculation in S7, the mechanical braking torque (Tbmr) is set to 0 in S11, and then S13 is performed as described above.

When determination is made in S1 that the malfunction signal is generated or when determination is made in S3 that the regeneration is not possible, the process proceeds to S8. The motor torque (Tm) is set to 0. Then, the process proceeds to S12. A mechanical braking torque (Tbmr), based on the operation amount of the regenerative brake operator 8, is calculated with reference to Table 5 illustrated in FIG. 16. Thus, when determination is made that the regenerative system has malfunctioned or the regeneration is not possible, the braking torque can be generated by the mechanical brake (driving wheel mechanical brake 3a) based on the operation amount of the regenerative brake operator 8. After the calculation in S12, S13 is performed as described above.

Next, control on the motor vehicle (motor control) according to this embodiment is described with reference to a flowchart of FIG. 18.

In S1, determination is first made as to whether the regenerative system is normal based on whether the malfunction signal is generated. When determination is made that the malfunction signal is not generated, determination is made in S2 as to whether the accelerator operator 6 is operated (whether the accelerator operation amount Ap is larger than 0). When determination is made that the accelerator operator 6 is operated, determination is made in S3 as to whether the power storage status (Soc2) of the second power storage device 5 is higher than the predetermined lower limit value (see FIG. 28).

When determination is made in S3 that the power storage status (Soc2) of the second power storage device 5 is not higher than the predetermined lower limit value (see FIG. 28), determination is made in S6 as to whether the rotation speed ($\omega$) of the motor 1 is lower than $\omega3$ (see FIGS. 20 and 23). When determination is made that the rotation speed ($\omega$) of the motor 1 is not lower than $\omega3$ (high-speed rotation), the process proceeds to S7, and function circuit control (FCC) is set to 1. When determination is made in S6 that the rotation speed ($\omega$) of the motor 1 is lower than $\omega3$ (low-speed rotation), the process proceeds to S8, and FCC is set to 2.

When determination is made in S3 that the power storage status (Soc2) of the second power storage device 5 is higher than the predetermined lower limit value (see FIG. 28), the process proceeds to S9, and FCC is set to 3. When determination is made in S2 that the accelerator operator 6 is not operated, determination is made in S4 as to whether the regeneration in the motor 1 is possible. In S4, determination is made that the regeneration in the motor 1 is possible when the power storage status (Soc1) of the first power storage device 4 is equal to or lower than the predetermined upper limit value (see FIG. 27) and the rotation speed of the motor is equal to or higher than $\omega1$ (see FIG. 8).

When determination is made in S4 that the regeneration in the motor 1 is possible, determination is made in S5 as to whether the power storage status (Soc2) of the second power storage device 5 is higher than the predetermined upper limit value (see FIG. 28). When determination is made that the power storage status (Soc2) of the second power storage device 5 is higher than the predetermined upper limit value, the process proceeds to S10, and FCC is set to 4. When determination is made that the power storage status (Soc2) of the second power storage device 5 is not higher than the predetermined upper limit value, the process proceeds to S11, and FCC is set to 5. When determination is made in S1 that the malfunction signal is generated or when determination is made in S4 that the regeneration in the motor 1 is not possible, the process proceeds to S12, and FCC is set to 6.

After any one of the modes FCC from 1 to 6 is determined as described above, determination is made in S13 as to whether a mode determined in a previous process (FCCO) is changed to the mode determined in the current process FCC. When determination is made that the mode is not changed, the process proceeds to S14, and the FCCNO determined in any one of S7 to S12 is maintained. When determination is made that the mode is changed, the process proceeds to S15, and (FCCNO) is set to 7. Then, control associated with the FCCNO is performed in S16. In S17, the mode determined in the current process FCC is stored as FCCO. In S18, inverter control is performed.

The control in S16 is performed with reference to a control table of FIG. 19. The following are details of the control in the control table.

When FCCNO=1, the switches S1 and S2 of the semiconductor switching elements 10a and 10b are turned OFF (the power converter 10 is turned OFF), the first switch S3 and the second switch S4 are turned OFF, and the switch Sa is turned ON. In the control table, "capacitor series connection" means a state where "the second power storage device 5 is connected in series between the reactor 10c of the power converter 10 and the inverter 2".

When FCCNO=2, the switches S1 and S2 of the semiconductor switching elements 10a and 10b are subjected to duty control during the power driving. Thus, the power converter 10 steps down the output voltage of the first power storage device 4. Further, the first switch S3 is turned ON, the second switch S4 is turned OFF, and the switch Sa is turned OFF. When FCCNO=2, current control of the inverter 2 is performed with reference to Table A illustrated in FIG. 20.

According to Table A, when the current control of the inverter 2 is performed under PWM control, the DC voltage of the inverter 2 is controllable based on the rotation speed (ω) of the motor 1 as illustrated in FIG. 20. When the rotation speed of the motor 1 is equal to or lower than the predetermined rotation speed (ω3), the DC voltage of the inverter 2 is controlled to decrease as the rotation speed of the motor 1 decreases. Also in Tables B and C described later, it is assumed that the current control of the inverter 2 is performed under the PWM control.

When FCCNO=3, the switches S1 and S2 of the semiconductor switching elements 10a and 10b are subjected to duty control during the power driving. Thus, the power converter 10 steps down the output voltage of the first power storage device 4. Further, the first switch S3 is turned OFF, the second switch S4 is turned ON, and the switch Sa is turned OFF. When FCCNO=3, the current control of the inverter 2 is performed with reference to Table A illustrated in FIG. 20 similarly to the case where FCCNO=2.

When FCCNO=4, the switches S1 and S2 of the semiconductor switching elements 10a and 10b are subjected to duty control during the regeneration so that the power converter 10 steps up the inverter DC voltage. Further, the first switch S3 is turned ON, the second switch S4 is turned OFF, and the switch Sa is turned OFF. When FCCNO=4, the current control of the inverter 2 is performed with reference to Table B illustrated in FIG. 21.

When FCCNO=5, the switches S1 and S2 of the semiconductor switching elements 10a and 10b are subjected to duty control during the regeneration. Thus, the power converter 10 steps up the resultant output voltage of the inverter 2 and the second power storage device 5. Further, the first switch S3 is turned OFF, the second switch S4 is turned ON, and the switch Sa is turned OFF. When FCCNO=5, the current control of the inverter 2 is performed with reference to Table C illustrated in FIG. 22.

When FCCNO=6, the switches S1 and S2 of the semiconductor switching elements 10a and 10b are turned OFF (the power converter 10 is turned OFF). The first switch S3, the second switch S4, and the switch Sa are turned OFF. When FCCNO=7, the switches S1 and S2 of the semiconductor switching elements 10a and 10b are subjected to duty control. The first switch S3, the second switch S4, and the switch Sa are turned OFF.

In the embodiment described above, Tables A to C are applied on the premise that the current control of the inverter 2 is performed under the pulse width modulation (PWM) control. Instead, the current control of the inverter 2 may depend on a peak value of a motor line-to-line voltage considering Pulse Amplitude Modulation (PAM) technique. That is, the PWM control is control for changing a width of a switching frequency (pulse width) changing a current flow rate of the inverter relative to the predetermined inverter DC voltage. The control depending on the peak value of the motor line-to-line voltage is control for changing the DC voltage of the inverter depending on the peak value of the motor line-to-line voltage as illustrated in FIGS. 23 to 26.

In the case where the current control of the inverter 2 is performed under the control depending on the peak value of the motor line-to-line voltage, in Table A illustrated in FIG. 23, the DC voltage of the inverter 2 is controlled based on the peak value of the motor line-to-line voltage when the rotation speed of the motor 1 is equal to or lower than the predetermined rotation speed (ω3). In Table B, control is performed as illustrated in FIG. 24. In Table C, control is performed as illustrated in FIG. 25. FIG. 26 is a time chart illustrating an example of a switching operation of the inverter circuit and behavior of the motor line-to-line voltage. A fundamental wave is illustrated of the motor line-to-line voltage in a case where the current is controlled with reference to any one of the tables in FIGS. 23 to 25. The inverter DC voltage is equal to the peak value of the motor line-to-line voltage. In this time chart, the inverter DC voltage (Vinv) agrees with a peak value of the fundamental wave of the motor line-to-line voltage.

In the motor vehicle according to the embodiment described above, when the rotation speed of the motor 1 is equal to or higher than the predetermined value, the predetermined braking torque, based on the operation amount of the regenerative brake operator 8, is generated by the regenerative braking. Thus, a braking torque intended by the driver can be generated by the regenerative braking over a wide rotation range of the motor 1.

That is, the predetermined braking torque is generated only by the regenerative braking based on the operation amount of the regenerative brake operator 8. Therefore, the braking force intended by the driver can stably be obtained without a sense of discomfort about brake actuation characteristics (response and brake application level) compared with a case where the predetermined braking torque is generated by combining the mechanical brake and the regenerative braking during high-speed rotation of the motor. Since the speed range for the use of the regenerative braking is wide, the energy regeneration efficiency increases and the frequency of use of the mechanical brake (driving wheel mechanical brake 3*a*) decreases. Thus, a decrease in the durability of the mechanical brake component can be suppressed.

The maximum value of the predetermined braking torque during the regeneration in the motor 1 is the rated torque of the motor 1. Therefore, a sufficient braking torque intended by the driver can be obtained and the regenerated energy can be increased at the predetermined rotation speed or higher. Further, the power converter 10, with the voltage step down function during the power driving and the voltage step up function during the regeneration, is provided and the energy is recovered via the power converter 10 during the regeneration. Therefore, the predetermined braking torque can be generated only by the regenerative braking in a range covering lower-speed rotation compared with a system where the voltage is not stepped up during the regeneration. Thus, the regenerated energy can be increased.

When the rotation speed of the motor 1 is lower than the predetermined value, the braking torque is generated by the mechanical brake (driving wheel mechanical brake 3*a*) based on the operation amount of the regenerative brake operator 8. In an extremely low-speed rotation range of the motor 1, it is difficult to perform the regenerative braking until the vehicle is stopped even though step-up control is performed. Therefore, when the vehicle speed is lower than a predetermined value, the braking torque can securely be generated by the mechanical brake instead of the regenerative braking.

The power storage devices are the first power storage device 4, a large-capacity characteristic, and the second power storage device 5, with a high-power characteristic. The motor vehicle includes the circuit where the power converter, with voltage step down function during the power driving, is connected to the first power storage device 4 and the second power storage device 5 is connected in series between the reactor 10*c* of the power converter 10 and the inverter 2. During the regeneration in the motor 1, the energy is recovered into the first power storage device 4 and the second power storage device 5 by using the circuit. Thus, the rated torque can be generated only by the regenerative braking in a range covering higher-speed rotation compared with a motor rotation speed where the rated torque can be generated only in the first power storage device 4 during the regeneration in the motor 1.

When the charge level of the first power storage device 4 is equal to or higher than the predetermined value, the braking torque is generated by the mechanical brake (driving wheel mechanical brake 3*a*) based on the operation amount of the regenerative brake operator 8. Determination is made that no more charging can be made when the charge level of the first power storage device 4 is equal to or higher than the predetermined value. Even though the regenerative braking is difficult, the braking torque can securely be generated by the mechanical brake instead of the regenerative braking. This embodiment is applied to the saddled vehicle. Even though the two brake operators that are the regenerative brake operator 8 and the mechanical brake operator 7 are provided, an increase in costs can be avoided because there is no need to add a new operator separately.

During the power driving of the motor, the output voltage of the first power storage device 4 is stepped down to supply the energy from the first power storage device 4 and the second power storage device 5 to the inverter 2. The series combination of the converter 10 output voltage and the voltage of the second storage device 5 enable step up of the voltage at the inverter 2 DC terminals. The adjustment can be made in accordance with the setting of the DC voltage of the inverter 2 by stepping up and down the resultant output voltage of the first power storage device 4 and the second power storage device 5. Therefore, even if the set value of the DC voltage of the inverter 2 is changed, a standard-voltage storage battery can be used and an increase in manufacturing costs can be prevented.

Particularly in this embodiment, the switches S1 and S2 of the semiconductor switching elements 10*a* and 10*b* of the power converter 10 are subjected to duty control during the power driving to optimally step up and down the inverter DC voltage of the motor 1 relative to the voltage of the first power storage device 4 combined with the second power storage device 5. Further, the supplied power driving energy is shared by the first power storage device 4 and the second power storage device 5. Therefore, the current of the first power storage device 4 is smaller than that in a case where the same amount of power driving energy is supplied only by the first power storage device 4. Thus, even if the power driving energy is large, the current of the first power storage device 4 can be kept small and the life of the first power storage device 4 can be prolonged.

The first switch S3 and the second switch S4 are provided and determination can be made about the power storage status of the second power storage device 5 based on the voltage level of the second power storage device 5. When the power storage status of the second power storage device 5 is equal to or lower than the predetermined lower limit value during the power driving of the motor 1, the first switch S3 is turned ON and the second switch S4 is turned OFF. This supplies energy from only the first power storage device 4 to the inverter 2 while stepping down the output voltage of the first power storage device 4. Thus, even if the charge in the second power storage device 5 is empty, the power driving of the motor 1 can be continued by using the energy of the first power storage device 4, thereby allowing the vehicle to travel.

The first switch S3 and the second switch S4 are provided and determination can be made about the power storage status of the second power storage device 5 based on the voltage of the second power storage device 5. When the power storage status of the second power storage device 5 is equal to or higher than the predetermined upper limit value during the regeneration in the motor 1, the first switch S3 is turned ON and the second switch S4 is turned OFF. This stores regenerative energy in the first power storage device 4 while stepping up the DC voltage of the inverter 2. Thus, even if the charge in the second power storage device 5 is full, the regeneration in the motor 1 can be continued by storing the regenerative energy in the first power storage device 4.

During the current control of the inverter 2, the DC voltage of the inverter 2 is controllable based on the rotation speed of the motor 1. When the rotation speed of the motor 1 is equal to or lower than the predetermined rotation speed, the DC voltage of the inverter 2 is controlled to decrease as the rotation speed of the motor 1 decreases. Therefore, the DC voltage of the inverter 2 can be reduced during low-speed rotation, and instantaneous power of the switches can be reduced. Thus, the switching loss can be reduced during the low-speed rotation.

When the rotation speed of the motor 1 is equal to or lower than the predetermined rotation speed during the current control of the inverter 2, the DC voltage of the inverter 2 is controlled based on the peak value of the motor line-to-line voltage. Therefore, a fixed PAM switching pattern for reducing the low-order harmonic component, having a switching frequency that is about three times as high as the fundamental waveform frequency, can be used as the switching pattern. Thus, the switching frequency can become 1/30 or lower than switching frequency in the PWM control (duty control at a constant inverter DC voltage). Thus, the switching loss can become 1/30 or lower than switching loss in the PWM control.

Although the embodiments are described above, the present disclosure is not limited to those embodiments. For example, the first power storage device 4 may be a power storage device in another form with a larger-capacity characteristic than the second power storage device 5. Alternatively, the second power storage device 5 may be a power storage device in another form with a higher-power characteristic than the first power storage device 4. The semiconductor switching element may be an IGBT in place of the MOSFET. The present disclosure may be applied to a vehicle without the monitor 13, or to a three-wheel or four-wheel vehicle such as a buggy.

The present disclosure is also applicable to a motor vehicle having a different appearance or having other functions as long as the predetermined braking torque based on the operation amount of the regenerative brake operator is generated by the regenerative braking when the rotation speed of the motor is equal to or higher than the predetermined value.

The present disclosure has been described with reference to the preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A motor vehicle comprising:
    a motor performing power driving and regeneration;
    an inverter converting a direct current into an alternating current;
    a mechanical brake braking by releasing energy;
    a power storage device supplying energy to the motor;
    an accelerator operator controlling the motor to adjust a drive torque of a driving wheel;
    a mechanical brake operator controlling the mechanical brake to adjust a braking torque;
    a regenerative brake operator controlling the motor to adjust a braking torque of the driving wheel and recover the energy into the power storage device; and
    a detector detecting a rotation speed of the motor,
    wherein, when the rotation speed of the motor is equal to or higher than a predetermined value, a predetermined braking torque, based on an operation amount of the regenerative brake operator, is generated by regenerative braking.

2. The motor vehicle according to claim 1, wherein a maximum value of the predetermined braking torque during the regeneration in the motor is a rated torque of the motor.

3. The motor vehicle according to claim 1, further comprising a power converter, with a voltage step down function during the power driving and a voltage step up function during the regeneration,
    wherein the energy is recovered via the power converter during the regeneration.

4. The motor vehicle according to claim 3,
    wherein the power storage device comprises:
    a first power storage device with a large-capacity characteristic; and
    a second power storage device with a high-power characteristic,
    wherein the motor vehicle further comprises a circuit where the power converter with the voltage step down function during the power driving is connected to the first power storage device and the second power storage device is connected in series between a reactor of the power converter and the inverter, and
    wherein the energy is recovered into the first power storage device and the second power storage device by using the circuit during the power regeneration of the motor.

5. The motor vehicle according to claim 4, wherein, when a charge level of the first power storage device is equal to or higher than a predetermined value, the braking torque is generated by the mechanical brake based on the operation amount of the regenerative brake operator.

6. The motor vehicle according to claim 1, wherein, when the rotation speed of the motor is lower than the predetermined value, the braking torque is generated by the mechanical brake based on the operation amount of the regenerative brake operator.

7. The motor vehicle according to claim 1, wherein the motor vehicle is a saddled vehicle.

* * * * *